US011934165B2

United States Patent
Barr et al.

(10) Patent No.: US 11,934,165 B2
(45) Date of Patent: Mar. 19, 2024

(54) SMART HOME SYSTEM WITH INTEGRATION OF SMART WINDOWS

(71) Applicant: Ubiquitous Energy, Inc., Redwood City, CA (US)

(72) Inventors: Miles C. Barr, Redwood City, CA (US); Ian Millard, Palo Alto, CA (US); Rachel Molaro, Redwood City, CA (US); Susan Stone, Redwood City, CA (US); Veeral Hardev, Redwood City, CA (US); Christopher Traverse, Redwood City, CA (US); Anthony Sagneri, Redwood City, CA (US); David Maikowski, Redwood City, CA (US); Edwin Hathaway, Redwood City, CA (US); Bradley J. Gleeson, Redwood City, CA (US)

(73) Assignee: Ubiquitous Energy, Inc., Redwood City, CA (US)

( * ) Notice: Subject to any disclaimer, the term of this patent is extended or adjusted under 35 U.S.C. 154(b) by 0 days.

(21) Appl. No.: 17/512,467

(22) Filed: Oct. 27, 2021

(65) Prior Publication Data
US 2022/0128960 A1   Apr. 28, 2022

Related U.S. Application Data

(60) Provisional application No. 63/106,857, filed on Oct. 28, 2020.

(51) Int. Cl.
*E06B 9/24* (2006.01)
*G05B 19/042* (2006.01)
(Continued)

(52) U.S. Cl.
CPC .............. *G05B 19/042* (2013.01); *E06B 9/24* (2013.01); *G06F 3/0482* (2013.01);
(Continued)

(58) Field of Classification Search
CPC .......... G05B 19/042; G05B 2219/2628; G05B 2219/2642; G05B 2219/37283;
(Continued)

(56) References Cited

U.S. PATENT DOCUMENTS 10,944,586 B2   3/2021 Shearer
2013/0278989 A1   10/2013 Lam et al.
(Continued)

OTHER PUBLICATIONS

PCT/US2021/056888, "Invitation to Pay Additional Fees And, Where Applicable Protest Fee", dated Dec. 21, 2021, 2 pages.
(Continued)

*Primary Examiner* — Michael W Choi
(74) *Attorney, Agent, or Firm* — Kilpatrick Townsend & Stockton LLP

(57) ABSTRACT

Described herein are systems, methods, devices, and other techniques for implementing smart windows, smart home systems that include smart windows, and user devices and applications for control thereof. A smart window, or photovoltaic window, may include a photovoltaic configured to generate electrical power from incident light onto the photovoltaic window, store the electrical power, and send the electrical power to an electronics package or various electrical loads including a wireless communication system, sensors, or window functions. The photovoltaic window may communicate with various smart home system devices such as hub devices and user devices, which may include the reception of control data at the photovoltaic window and the transmission of sensor data captured by the window sensors.

18 Claims, 31 Drawing Sheets

(51) Int. Cl.
  *G06F 3/0482*  (2013.01)
  *G06F 3/0484*  (2022.01)
  *G08C 17/02*  (2006.01)
  *H02S 20/26*  (2014.01)
  *H04N 7/18*  (2006.01)

(52) U.S. Cl.
  CPC .......... *G06F 3/0484* (2013.01); *G08C 17/02* (2013.01); *H02S 20/26* (2014.12); *H04N 7/181* (2013.01); *E06B 2009/2464* (2013.01); *E06B 2009/2476* (2013.01); *G05B 2219/2628* (2013.01); *G05B 2219/2642* (2013.01); *G05B 2219/37283* (2013.01); *G08C 2201/10* (2013.01); *G08C 2201/30* (2013.01)

(58) Field of Classification Search
  CPC .............. E06B 9/24; E06B 2009/2464; E06B 2009/2476; E06B 3/4407; E06B 3/5807; E06B 2009/6809; E06B 3/66; E06B 3/6617; E06B 3/66314; E06B 3/6722; G06F 3/0482; G06F 3/0484; G08C 17/02; G08C 2201/10; G08C 2201/30; H02S 20/26; H04N 7/181; Y02B 10/10; Y02E 10/50
  See application file for complete search history.

(56) References Cited

U.S. PATENT DOCUMENTS

| | | | |
|---|---|---|---|
| 2014/0330538 A1* | 11/2014 | Conklin | G01M 99/00 |
| | | | 702/189 |
| 2015/0098121 A1 | 4/2015 | Turnbull et al. | |
| 2015/0185292 A1* | 7/2015 | Doi | H01M 10/488 |
| | | | 340/870.02 |
| 2015/0219975 A1 | 8/2015 | Phillips et al. | |
| 2017/0238401 A1 | 8/2017 | Sadwick et al. | |
| 2018/0233609 A1* | 8/2018 | Bishop | H01L 31/022425 |
| 2019/0036480 A1 | 1/2019 | Barr et al. | |
| 2019/0119978 A1 | 4/2019 | Hall et al. | |
| 2019/0162014 A1 | 5/2019 | Gleason et al. | |
| 2019/0221692 A1 | 7/2019 | Wang | |
| 2019/0256105 A1 | 8/2019 | Parat et al. | |
| 2019/0364880 A1 | 12/2019 | Norton et al. | |
| 2020/0026141 A1* | 1/2020 | Brown | H04L 12/4625 |
| 2020/0091355 A1 | 3/2020 | Barr et al. | |
| 2020/0335640 A1 | 10/2020 | Millard | |
| 2020/0395885 A1 | 12/2020 | Janowski | |
| 2021/0356153 A1* | 11/2021 | Nesler | F24F 11/0001 |
| 2022/0130118 A1 | 4/2022 | Malia et al. | |

OTHER PUBLICATIONS

PCT/US2021/056888, "International Search Report and Written Opinion", dated Feb. 24, 2022, 12 pages.
U.S. Appl. No. 17/512,470, "Non-Final Office Action", dated Sep. 1, 2022, 17 pages.
U.S. Appl. No. 17/512,465, "Final Office Action", dated May 1, 2023, 27 pages.
U.S. Appl. No. 17/512,470, "Notice of Allowance", dated May 26, 2023, 7 pages.
PCT/US2021/056888, "International Preliminary Report on Patentability", dated May 11, 2023, 9 pages.
U.S. Appl. No. 17/512,465, "Non-Final Office Action", dated Dec. 23, 2022, 27 pages.
U.S. Appl. No. 17/512,470, "Final Office Action", dated Feb. 10, 2023, 20 pages.
U.S. Appl. No. 17/512,465, "Notice of Allowance", dated Aug. 22, 2023, 11 pages.

* cited by examiner

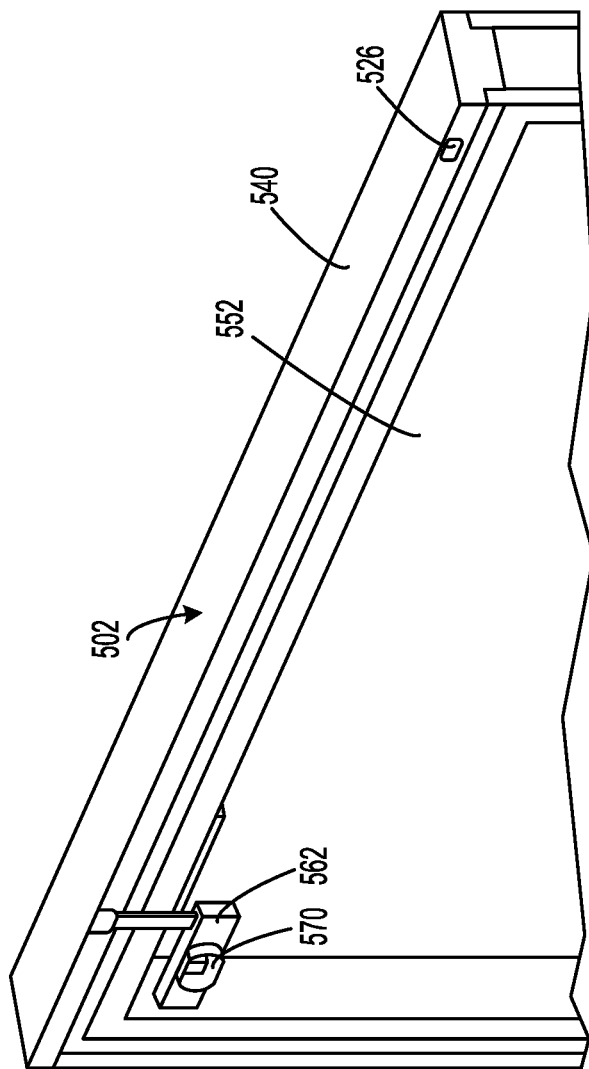
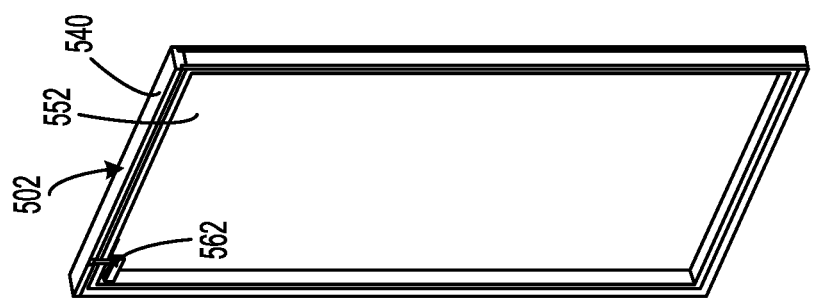
FIG. 5B
FIG. 5A

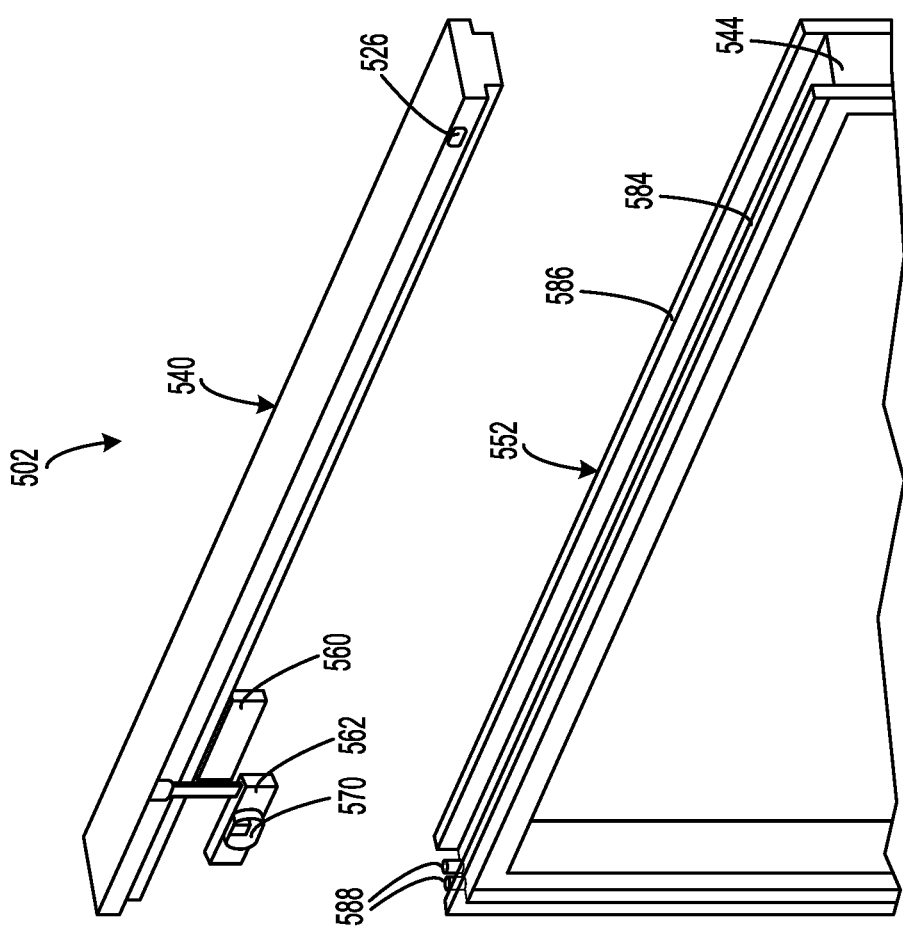

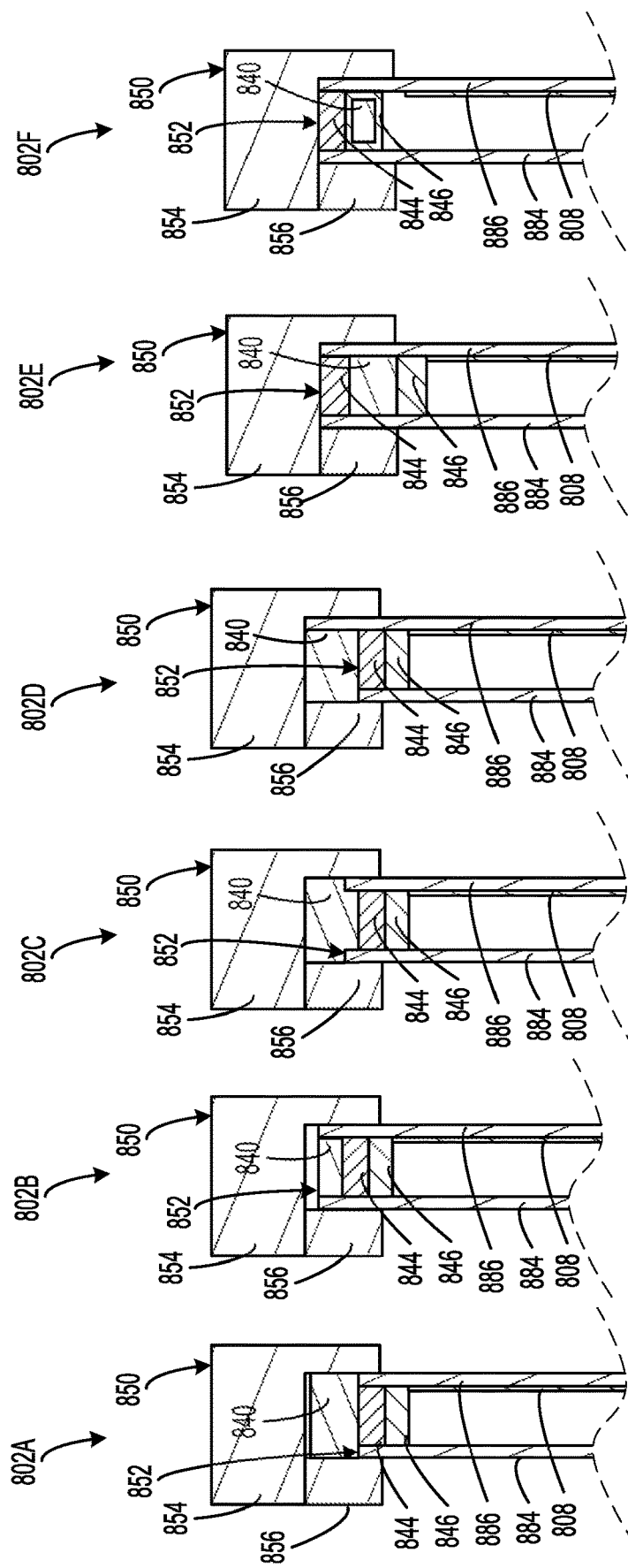

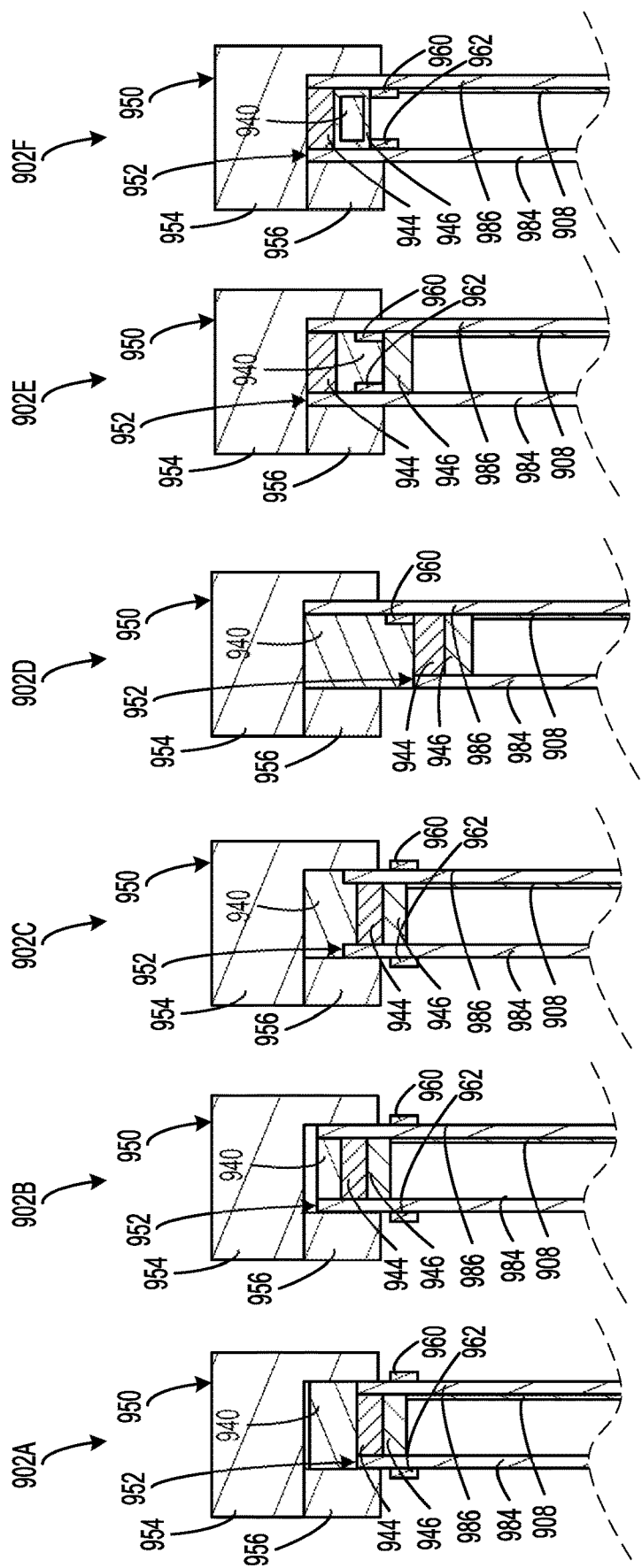

| Lower Bounds Summary<br>3'x5' Photovoltaic Window @ 1% | kWh/day |
|---|---|
| N/E/S/W - All US* | 0.0025 |
| N/E/S/W - Zones 1-3 | 0.0075 |
| E/S/W (no North) - all US* | 0.0075 |
| E/S/W (no North) - Zones 1-3 | 0.0175 |
| S Only - All US* | 0.0150 |

*Lower 48 states

SMART HOME SYSTEM WITH INTEGRATION OF SMART WINDOWS

CROSS-REFERENCES TO RELATED APPLICATIONS

This application claims the benefit of priority to U.S. Provisional Patent Application No. 63/106,857, filed Oct. 28, 2020, entitled "PHOTOVOLTAIC SMART WINDOW," the entire content of which is incorporated herein by reference for all purposes.

BACKGROUND OF THE INVENTION

Photovoltaic devices are commonly employed to convert light into electricity by using the photovoltaic effect, in which absorbed light causes the excitation of an electron or other charge carrier to a higher-energy state. The separation of charge carriers of opposite types leads to a voltage that can be utilized by an external circuit. Photovoltaic devices, such as photovoltaic solar cells, can be packaged together to constitute a photovoltaic array of a larger photovoltaic system, such as a solar panel. The use of photovoltaic systems to generate electricity is an important form of renewable energy that continues to become a mainstream electricity source worldwide.

The surface area necessary to take advantage of solar energy remains an obstacle to offsetting a significant portion of non-renewable energy consumption. For this reason, low-cost, transparent, organic photovoltaic (OPV) devices that can be integrated onto window panes in homes, skyscrapers, and automobiles are desirable. For example, window glass utilized in automobiles and architecture are typically 70-80% and 40-80% transmissive, respectively, to the visible spectrum, e.g., light with wavelengths from about 450 to 650 nm. The low mechanical flexibility, high module cost and, more importantly, the band-like absorption of inorganic semiconductors limit their potential utility to transparent solar cells.

In contrast to inorganic semiconductors, the optical characteristics of organic and molecular semiconductors result in absorption spectra that are highly structured with absorption minima and maxima that are uniquely distinct from the band absorption of their inorganic counterparts. However, while a variety of organic and molecular semiconductors exist, many exhibit strong absorption in the visible spectrum and thus are not optimal for use in window glass-based photovoltaics. Despite the progress made, there is a need in the art for improved systems, methods, and device structures in the field of transparent solar technology.

SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a photovoltaic window comprising: a glass unit including one or both of: an interior glass; or an exterior glass; a photovoltaic disposed in parallel with the interior glass or the exterior glass of the glass unit, the photovoltaic configured to generate electrical power from incident light onto the photovoltaic window; an electronics package coupled with the glass unit, the electronics package configured to receive, store, and distribute the electrical power; and at least one electrical load configured to receive the electrical power from the electronics package and consume the electrical power.

Example 2 is the photovoltaic window of example(s) 1, wherein the photovoltaic window does not receive external electrical power from a power source that is external to the photovoltaic window.

Example 3 is the photovoltaic window of example(s) 1-2, wherein the photovoltaic window has an average visible transmittance (AVT) of at least 30%.

Example 4 is the photovoltaic window of example(s) 1-3, wherein the photovoltaic substantially covers a visible portion of the photovoltaic window.

Example 5 is the photovoltaic window of example(s) 1-4, wherein the at least one electrical load includes an exterior sensor module that includes one or more sensors directed toward an exterior side of the photovoltaic window.

Example 6 is the photovoltaic window of example(s) 5, wherein the exterior sensor module is mounted on either an exterior side of the exterior glass or an interior side of the exterior glass.

Example 7 is the photovoltaic window of example(s) 5, wherein the exterior sensor module includes an exterior-facing camera.

Example 8 is the photovoltaic window of example(s) 1-7, wherein the at least one electrical load includes an interior sensor module that includes one or more sensors directed toward an interior side of the photovoltaic window.

Example 9 is the photovoltaic window of example(s) 8, wherein the interior sensor module is mounted on either an interior side of the interior glass or an exterior side of the interior glass.

Example 10 is the photovoltaic window of example(s) 8, wherein the interior sensor module includes an interior-facing camera.

Example 11 is the photovoltaic window of example(s) 1-10, wherein the at least one electrical load includes a wireless communication system that is configured to communicate with an external device.

Example 12 is the photovoltaic window of example(s) 1-11, wherein the at least one electrical load includes one or more window functions installed at the photovoltaic window including at least one of: a window opening/closing mechanism; a window locking/unlocking mechanism; electric blinds; a polymer-dispersed liquid crystals (PDLC) film; an electrochromic device; or a light source.

Example 13 is the photovoltaic window of example(s) 1-12, wherein one or more of the at least one electrical load is included in the electronics package.

Example 14 is the photovoltaic window of example(s) 1-13, wherein the electronics package is disposed along a peripheral edge of the glass unit.

Example 15 is the photovoltaic window of example(s) 1-14, wherein the electronics package is mounted to a peripheral edge of the glass unit.

Example 16 is the photovoltaic window of example(s) 1-15, wherein the electronics package is at least partially disposed between the interior glass and the exterior glass.

Example 17 is the photovoltaic window of example(s) 1-16, wherein the glass unit includes both the interior glass and the exterior glass, and wherein the photovoltaic window further includes: a spacer disposed between the interior glass and the exterior glass.

Example 18 is the photovoltaic window of example(s) 17, wherein the electronics package is at least partially embedded in the spacer.

Example 19 is the photovoltaic window of example(s) 1-18, further comprising: a frame assembly that supports at least one peripheral edge of the glass unit.

Example 20 is the photovoltaic window of example(s) 19, wherein the frame assembly includes: a frame; and a glazing stop.

Example 21 is the photovoltaic window of example(s) 20, wherein the electronics package is at least partially embedded in the frame or the glazing stop.

Example 22 is a method of operating a photovoltaic window, the method comprising: generating electrical power from incident light onto the photovoltaic window using a photovoltaic disposed in parallel with an interior glass or an exterior glass of a glass unit of the photovoltaic window; sending the electrical power from the photovoltaic to an electronics package of the photovoltaic window coupled with the glass unit; storing the electrical power at the electronics package; distributing the electrical power from the electronics package to at least one electrical load of the photovoltaic window; and consuming the electrical power at the at least one electrical load.

Example 23 is the method of example(s) 22, wherein the photovoltaic window does not receive external electrical power from a power source that is external to the photovoltaic window.

Example 24 is the method of example(s) 22, wherein the photovoltaic window has an average visible transmittance (AVT) of at least 30%.

Example 25 is the method of example(s) 22, wherein the photovoltaic substantially covers a visible portion of the photovoltaic window.

Example 26 is the method of example(s) 22, wherein the at least one electrical load includes an exterior sensor module that includes one or more sensors directed toward an exterior side of the photovoltaic window.

Example 27 is the method of example(s) 26, wherein the exterior sensor module is mounted on either an exterior side of the exterior glass or an interior side of the exterior glass.

Example 28 is the method of example(s) 22, wherein the at least one electrical load includes an interior sensor module that includes one or more sensors directed toward an interior side of the photovoltaic window.

Example 29 is the method of example(s) 28, wherein the interior sensor module is mounted on either an interior side of the interior glass or an exterior side of the interior glass.

Example 30 is the method of example(s) 22, wherein the at least one electrical load includes a wireless communication system that is configured to communicate with an external device.

Example 31 is the method of example(s) 22, wherein the at least one electrical load includes one or more window functions installed at the photovoltaic window including at least one of: a window opening/closing mechanism, a window locking/unlocking mechanism, electric blinds, a polymer-dispersed liquid crystals (PDLC) film, an electrochromic device, or a light source.

Example 32 is the method of example(s) 22, wherein one or more of the at least one electrical load is included in the electronics package.

Example 33 is the method of example(s) 22, wherein the electronics package is disposed along a peripheral edge of the glass unit.

Example 34 is the method of example(s) 22, wherein the electronics package is mounted to a peripheral edge of the glass unit.

Example 35 is the method of example(s) 22, wherein the electronics package is at least partially disposed between the interior glass and the exterior glass.

Example 36 is the method of example(s) 22, wherein the glass unit includes both the interior glass and the exterior glass, and wherein the photovoltaic window further includes a spacer disposed between the interior glass and the exterior glass.

Example 37 is the method of example(s) 36, wherein the electronics package is at least partially embedded in the spacer.

Example 38 is the method of example(s) 22, wherein the photovoltaic window further comprises a frame assembly that supports at least one peripheral edge of the glass unit.

Example 39 is the method of example(s) 38, wherein the frame assembly includes a frame and a glazing stop.

Example 40 is the method of example(s) 39, wherein the electronics package is at least partially embedded in the frame or the glazing stop.

Example 41 is a home automation system comprising: a plurality of photovoltaic windows; and a hub device communicatively coupled to the plurality of photovoltaic windows, wherein each photovoltaic window of the plurality of photovoltaic windows comprises: a glass unit including one or both of: an interior glass; or an exterior glass; a photovoltaic disposed in parallel with the interior glass or the exterior glass of the glass unit, the photovoltaic configured to generate electrical power from incident light onto the photovoltaic window; an electronics package coupled with the glass unit, the electronics package configured to receive, store, and distribute the electrical power; and at least one electrical load configured to receive the electrical power from the electronics package and consume the electrical power.

Example 42 is the home automation system of example(s) 41, wherein each photovoltaic window of the plurality of photovoltaic windows does not receive external electrical power from a power source that is external to the plurality of photovoltaic windows.

Example 43 is the home automation system of example(s) 41, wherein each photovoltaic window of the plurality of photovoltaic windows has an average visible transmittance (AVT) of at least 30%.

Example 44 is the home automation system of example(s) 41, wherein the photovoltaic substantially covers a visible portion of the photovoltaic window.

Example 45 is a home automation system comprising: a hub device; and one or more photovoltaic windows communicatively coupled to the hub device, wherein each photovoltaic window of the one or more photovoltaic windows includes: a photovoltaic configured to generate electrical power from incident light onto the photovoltaic window; and a wireless communication system configured to: receive the electrical power from the photovoltaic to enable wireless communication with the hub device, wherein the wireless communication system is solely powered by the electrical power generated by the photovoltaic; and send a data signal to the hub device, wherein the data signal includes information regarding the photovoltaic window.

Example 46 is the home automation system of example(s) 45, wherein each photovoltaic window of the one or more photovoltaic windows does not receive external electrical power from a power source that is external to the photovoltaic window.

Example 47 is the home automation system of example(s) 45, wherein each photovoltaic window of the one or more photovoltaic windows has an average visible transmittance (AVT) of at least 30%.

Example 48 is the home automation system of example(s) 45, wherein the photovoltaic substantially covers a visible portion of the photovoltaic window.

Example 49 is the home automation system of example(s) 45, wherein each photovoltaic window of the one or more photovoltaic windows includes: one or more sensors configured to receive the electrical power from the photovoltaic and to capture sensor data from one or both of an interior environment or an exterior environment, wherein the data signal includes the sensor data.

Example 50 is the home automation system of example(s) 45, wherein each photovoltaic window of the one or more photovoltaic windows includes: one or more window functions configured to receive the electrical power from the photovoltaic and to perform one or more window actions.

Example 51 is the home automation system of example(s) 50, wherein the one or more window functions includes at least one of: a window opening/closing mechanism; a window locking/unlocking mechanism; electric blinds; a polymer-dispersed liquid crystals (PDLC) film; an electrochromic device; or a light source.

Example 52 is the home automation system of example(s) 50, wherein the wireless communication system is further configured to: receive a control signal from the hub device; and perform the one or more window actions in accordance with the control signal.

Example 53 is the home automation system of example(s) 45, further comprising: one or more home functions configured to: receive external electrical power from a power source that is external to the one or more photovoltaic windows; receive a control signal from the hub device; and perform one or more home actions in accordance with the control signal.

Example 54 is the home automation system of example(s) 53, wherein the one or more home functions includes at least one of: room or exterior lighting; a heating or cooling system; or a door lock.

Example 55 is a method of operating a home automation system, the method comprising: for each photovoltaic window of one or more photovoltaic windows of the home automation system: generating electrical power from incident light onto the photovoltaic window using a photovoltaic of the photovoltaic window; sending the electrical power from the photovoltaic to a wireless communication system of the photovoltaic window to enable wireless communication with a hub device of the home automation system, wherein the wireless communication system is solely powered by the electrical power generated by the photovoltaic; and sending a data signal from the wireless communication system to the hub device, wherein the data signal includes information regarding the photovoltaic window; and receiving the data signal at the hub device from each of the one or more photovoltaic windows.

Example 56 is the method of example(s) 55, wherein each photovoltaic window of the one or more photovoltaic windows does not receive external electrical power from a power source that is external to the photovoltaic window.

Example 57 is the method of example(s) 55, wherein each photovoltaic window of the one or more photovoltaic windows has an average visible transmittance (AVT) of at least 30%.

Example 58 is the method of example(s) 55, wherein the photovoltaic substantially covers a visible portion of the photovoltaic window.

Example 59 is the method of example(s) 55, further comprising: for each photovoltaic window of one or more photovoltaic windows: sending the electrical power from the photovoltaic to one or more sensors of the photovoltaic window; and capturing sensor data at the one or more sensors from one or both of an interior environment or an exterior environment, wherein the data signal includes the sensor data.

Example 60 is the method of example(s) 55, further comprising: for each photovoltaic window of one or more photovoltaic windows: sending the electrical power from the photovoltaic to one or more window functions of the photovoltaic window; and performing one or more window actions at the one or more window functions.

Example 61 is the method of example(s) 60, wherein the one or more window functions includes at least one of: a window opening/closing mechanism, a window locking/unlocking mechanism, electric blinds, a polymer-dispersed liquid crystals (PDLC) film, an electrochromic device, or a light source.

Example 62 is the method of example(s) 60, further comprising: sending a control signal from the hub device to the wireless communication system of a particular photovoltaic window of the one or more photovoltaic windows; and performing the one or more window actions in accordance with the control signal at the particular photovoltaic window.

Example 63 is the method of example(s) 55, further comprising: receiving, at one or more home functions of the home automation system, external electrical power from a power source that is external to the one or more photovoltaic windows; sending a control signal from the hub device to the one or more home functions; and performing the one or more home actions at the one or more home functions in accordance with the control signal.

Example 64 is the method of example(s) 63, wherein the one or more home functions includes at least one of: room or exterior lighting, a heating or cooling system, or a door lock.

Example 65 is one or more non-transitory computer-readable media comprising instructions that, when executed by one or more processors, cause the one or more processors to perform operations for operating a home automation system, the operations comprising: for each photovoltaic window of one or more photovoltaic windows of the home automation system: causing electrical power to be generated from incident light onto the photovoltaic window using a photovoltaic of the photovoltaic window; causing the electrical power to be sent from the photovoltaic to a wireless communication system of the photovoltaic window to enable wireless communication with a hub device of the home automation system, wherein the wireless communication system is solely powered by the electrical power generated by the photovoltaic; and sending a data signal from the wireless communication system to the hub device, wherein the data signal includes information regarding the photovoltaic window; and receiving the data signal at the hub device from each of the one or more photovoltaic windows.

Example 66 is the one or more non-transitory computer-readable media of example(s) 65, further comprising: for each photovoltaic window of one or more photovoltaic windows: causing the electrical power to be sent from the photovoltaic to one or more sensors of the photovoltaic window; and capturing sensor data at the one or more sensors from one or both of an interior environment or an exterior environment, wherein the data signal includes the sensor data.

Example 67 is the one or more non-transitory computer-readable media of example(s) 65, further comprising: for each photovoltaic window of one or more photovoltaic windows: causing the electrical power to be sent from the photovoltaic to one or more window functions of the photovoltaic window; and performing one or more window actions at the one or more window functions.

Example 68 is the one or more non-transitory computer-readable media of example(s) 67, further comprising: sending a control signal from the hub device to the wireless communication system of a particular photovoltaic window of the one or more photovoltaic windows; and performing the one or more window actions in accordance with the control signal at the particular photovoltaic window.

Example 69 is the one or more non-transitory computer-readable media of example(s) 65, further comprising: sending a control signal from the hub device to one or more home functions of the home automation system; and performing the one or more home actions at the one or more home functions in accordance with the control signal.

Example 70 is a user device comprising: a user interface; a communication interface to communicate with one or more photovoltaic windows; and a processing subsystem that is communicatively coupled to the user interface and the communication interface, wherein the processing subsystem is configured to: generate a representation of a photovoltaic window of the one or more photovoltaic windows; receive a user input via the user interface indicating a selection of the representation of the photovoltaic window; generate, in response to receiving the user input, a control signal for modifying an operation of the photovoltaic window; and send, using the communication interface, the control signal to a wireless communication system of the photovoltaic window, wherein the wireless communication system is solely powered by electrical power generated by a photovoltaic of the photovoltaic window from incident light onto the photovoltaic window.

Example 71 is the user device of example(s) 70, wherein the processing subsystem is further configured to: execute an application program that allows a user to operate the user interface to provide the user input.

Example 72 is the user device of example(s) 70, wherein the control signal is sent to the wireless communication system of the photovoltaic window via a hub device of a home automation system, the hub device being communicatively coupled to the user device and the one or more photovoltaic windows.

Example 73 is the user device of example(s) 70, wherein the processing subsystem is further configured to: receive a data signal from the wireless communication system of the photovoltaic window, wherein the data signal includes information regarding the photovoltaic window.

Example 74 is the user device of example(s) 73, wherein the information regarding the photovoltaic window includes sensor data captured using one or more sensors of the photovoltaic window, wherein the one or more sensors are solely powered by the electrical power generated by the photovoltaic.

Example 75 is the user device of example(s) 70, further comprising: a display configured to display the representation of the photovoltaic window, wherein the representation of the photovoltaic window is a graphical representation.

Example 76 is the user device of example(s) 75, wherein the display is further configured to display a real-time exterior view of a home that is formed by stitching together images or videos captured by exterior-facing cameras of the one or more photovoltaic windows.

Example 77 is the user device of example(s) 70, wherein the user input indicates a selection of a window function from one or more window functions installed at the photovoltaic window.

Example 78 is a non-transitory computer-readable medium comprising instructions that, when executed by one or more processors of a user device, cause the one or more processors to perform operations comprising: generating a representation of a photovoltaic window; receiving a user input via a user interface of the user device indicating a selection of the representation of the photovoltaic window; generating, in response to receiving the user input, a control signal for modifying an operation of the photovoltaic window; and sending, using a communication interface of the user device, the control signal to a wireless communication system of the photovoltaic window, wherein the wireless communication system is solely powered by electrical power generated by a photovoltaic of the photovoltaic window from incident light onto the photovoltaic window.

Example 79 is the non-transitory computer-readable medium of example(s) 78, wherein the operations further comprise: executing an application program that allows a user to operate the user interface to provide the user input.

Example 80 is the non-transitory computer-readable medium of example(s) 78, wherein the control signal is sent to the wireless communication system of the photovoltaic window via a hub device of a home automation system, the hub device being communicatively coupled to the user device and the one or more photovoltaic windows.

Example 81 is the non-transitory computer-readable medium of example(s) 78, wherein the operations further comprise: receiving a data signal from the wireless communication system of the photovoltaic window, wherein the data signal includes information regarding the photovoltaic window.

Example 82 is the non-transitory computer-readable medium of example(s) 81, wherein the information regarding the photovoltaic window includes sensor data captured using one or more sensors of the photovoltaic window, wherein the one or more sensors are solely powered by the electrical power generated by the photovoltaic.

Example 83 is the non-transitory computer-readable medium of example(s) 78, wherein the operations further comprise: displaying, at a display of the user device, the representation of the photovoltaic window, wherein the representation of the photovoltaic window is a graphical representation.

Example 84 is the non-transitory computer-readable medium of example(s) 78, wherein the user input indicates a selection of a window function from one or more window functions installed at the photovoltaic window.

Example 85 is a computer-implemented method comprising: generating a representation of a photovoltaic window; receiving a user input via a user interface indicating a selection of the representation of the photovoltaic window; generating, in response to receiving the user input, a control signal for modifying an operation of the photovoltaic window; and sending, using a communication interface, the control signal to a wireless communication system of the photovoltaic window, wherein the wireless communication system is solely powered by electrical power generated by a photovoltaic of the photovoltaic window from incident light onto the photovoltaic window.

Example 86 is the computer-implemented method of example(s) 85, further comprising: executing an application program that allows a user to operate the user interface to provide the user input.

Example 87 is the computer-implemented method of example(s) 85, wherein the control signal is sent to the wireless communication system of the photovoltaic window via a hub device of a home automation system, the hub device being communicatively coupled the one or more photovoltaic windows.

Example 88 is the computer-implemented method of example(s) 85, further comprising: receiving a data signal from the wireless communication system of the photovoltaic window, wherein the data signal includes information regarding the photovoltaic window.

Example 89 is the computer-implemented method of example(s) 88, wherein the information regarding the photovoltaic window includes sensor data captured using one or more sensors of the photovoltaic window, wherein the one or more sensors are solely powered by the electrical power generated by the photovoltaic.

Example 90 is the computer-implemented method of example(s) 85, further comprising: displaying, at a display, the representation of the photovoltaic window, wherein the representation of the photovoltaic window is a graphical representation.

Example 91 is the computer-implemented method of example(s) 85, wherein the user input indicates a selection of a window function from one or more window functions installed at the photovoltaic window.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

FIG. 5A illustrates a perspective view of photovoltaic window having an IGU integrated with an electronics package.

FIG. 5B illustrates a zoomed-in version of FIG. 5A.

FIG. 5C illustrates an exploded, perspective view of a photovoltaic window including an IGU and an electronics package.

FIG. 8A illustrates a side view of a photovoltaic window.
FIG. 8B illustrates a side view of a photovoltaic window.
FIG. 8C illustrates a side view of a photovoltaic window.
FIG. 8D illustrates a side view of a photovoltaic window.
FIG. 8E illustrates a side view of a photovoltaic window.
FIG. 8F illustrates a side view of a photovoltaic window.
FIG. 9A illustrates a side view of a photovoltaic window.
FIG. 9B illustrates a side view of a photovoltaic window.
FIG. 9C illustrates a side view of a photovoltaic window.
FIG. 9D illustrates a side view of a photovoltaic window.
FIG. 9E illustrates a side view of a photovoltaic window.
FIG. 9F illustrates a side view of a photovoltaic window.

Figure 1:
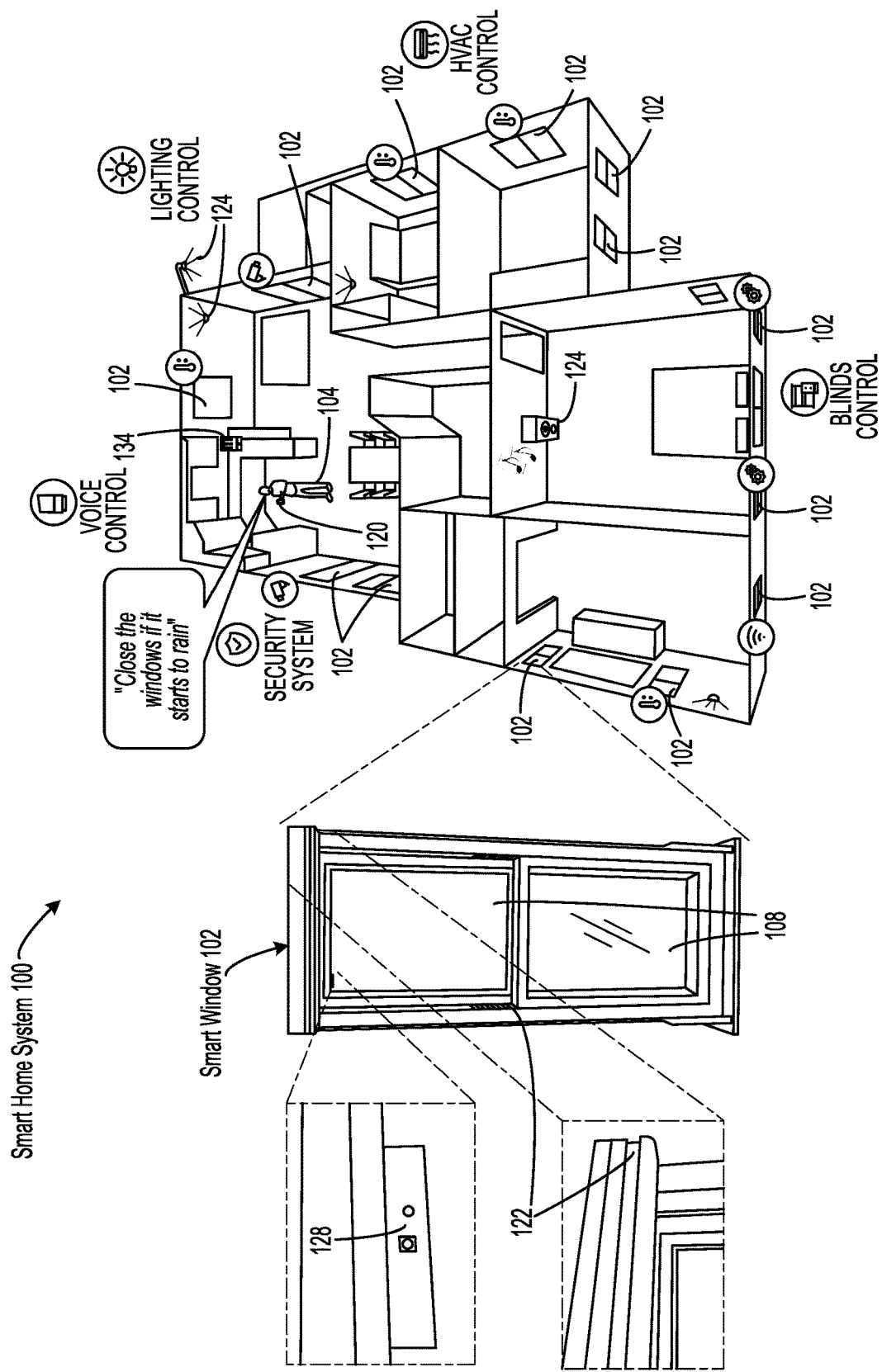
FIG. 1 illustrates an example of a smart home system having various smart windows.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label, irrespective of the suffix.

DETAILED DESCRIPTION OF THE INVENTION

The present disclosure relates generally to methods and systems related to smart window systems. More particularly, embodiments of the present invention provide smart window devices, smart home systems that include smart window devices, and user devices and applications for control of such devices and systems. Some embodiments of smart windows may include the integration of photovoltaics, power electronics, power storage, sensors, and/or a wireless communication system into an insulated glass unit (IGU) and/or a window frame assembly for installation in a home or building. While many embodiments are described in reference to windows for use in a home, embodiments are widely applicable to any building or structure in which a window or window-like apparatus may be installed, including various applications in residential, commercial, or industrial settings.

As used herein, the terms "smart window", "photovoltaic window", "photovoltaic smart window", "smart window device", "smart window system", and "photovoltaic window system" may be used interchangeably and may generally refer to an apparatus having a visible portion that separates an interior environment from an exterior environment and having one or more of the described components installed therein (e.g., photovoltaics, power electronics, power storage, sensors, wireless communication system, etc.), in accordance with the various embodiments of the present invention.

As used herein, the terms "smart home system", "smart system", "home automation system", and "automation system" may be used interchangeably and may generally refer to a wirelessly connected system of a smart window and at least one other device being either another smart window, a smart home hub, or a user device, in accordance with the various embodiments of the present invention. As such, the above terms may refer to a system having at least two smart windows, a system having at least a single smart window and a smart home hub, or a system having at least a single smart window and a user device, among other possibilities.

As used herein, the terms "smart home hub", "hub device", and "home automation hub" may be used interchangeably and may generally refer to a device (or base station) that exists within the smart home system that is wirelessly connected to at least one smart window and that is capable of receiving data from the smart window and/or transferring data to the smart window, in accordance with various embodiments of the present invention. As used herein, the terms "user device" and "control device" may be used interchangeably and may generally refer to a device that exists within the smart home system that is wirelessly connected to at least one smart window either directly or via the smart home hub, in accordance with the various embodiments of the present invention.

FIG. 1 illustrates an example of a smart home system 100 having various smart windows 102, according to some embodiments. Alternatively, smart home system 100 may be referred to as "home automation system 100" and smart windows 102 may be referred to as "photovoltaic windows 102". In the illustrated example, smart home system 100 is deployed in a residential house with various rooms, doors, windows, and furniture. Within smart home system 100, smart windows 102 may be communicatively coupled directly to each other or via a smart home hub 134, which in the illustrated example is a device situated on the kitchen countertop and receiving electrical power through the home's electrical system. Further illustrated in FIG. 1 is a user 104 of smart home system 100 holding a user device 120, which in the illustrated example is a mobile phone having an application program (or "app") installed thereon providing connectivity to smart home system 100.

Each of smart windows 102 may be self-powered using photovoltaics 108 that are integrated with the glass or visible area of the windows. For example, photovoltaics 108 may be integrated with the glass of one or both of the upper and lower panes of a vertical sliding window. Photovoltaics 108 may include organic transparent photovoltaics, luminescent solar concentrators (LSC), or other solar technologies having transparent properties. In some instances, photovoltaics 108 may include a number of visibly transparent photovoltaic devices that absorb optical energy at wavelengths outside the visible wavelength band of 450 nm to 650 nm, for example, while substantially transmitting visible light inside the visible wavelength band. In such embodiments, photovoltaics 108 may be configured to absorb ultraviolet (UV) and/or near-infrared (NIR) wavelengths in the layers and elements of the devices while visible light is transmitted therethrough.

In some embodiments, photovoltaics 108 may be considered to be visibly transparent, at least partially visibly transparent, substantially visibly transparent, and the like. In some embodiments, photovoltaics 108 may be considered to be visibly transparent when they are characterized by an average visible transmittance (AVT) of at least 30%. In various embodiments, photovoltaics 108 may be characterized by an AVT of at least 10%, at least 20%, at least 30%, at least 40%, at least 50%, at least 60%, at least 70%, at least 80%, at least 90%, or approximately 100%.

Each of smart windows 102 may include various electrical loads that are solely powered by photovoltaics 108, without receiving any power from the home's electrical system. For example, smart windows 102 may include various sensors 128 and window functions 122 that are powered by the solar energy harvested by photovoltaics 108. In the illustrated example, sensors 128 include a camera facing the exterior side of the window, which may be used, in some embodiments, as part of the home's security system to monitor and detect movement occurring on the exterior of the home. Further in the illustrated example, window functions 122 include electric blinds that may open (e.g., retract up and/or rotate open) or close (e.g., extend down and/or rotate close) is response to receiving a control signal to do so. Further in the illustrated example, window functions 122 may include an electric mechanism for opening or closing the window (e.g., a motorized track).

Smart home system 100 may include various home functions 124 that are powered separately from smart window 102 using the home's electrical system or some other power source. In the illustrated example, home functions 124 include room lighting and exterior lighting that may be turned on or off (or dimmed) in response to receiving a control signal to do so. Further in the illustrated example, home functions 124 include an audio system that may be turned on or off, or may be controlled in a more specific manner (e.g., to play a particular song at a particular volume, etc.).

User 104 may interact with smart home system 100 and smart windows 102 in a number of ways. For example, user 104 may use an application program running on user device 120 to connect to smart home system 100 to display information about smart windows 102 and/or to transmit control data to modify an operation of smart windows 102. Alternatively or additionally, user 104 may use smart home hub 134 to interact with smart windows 102. For example, in the illustrated example, user 104 provides the audible command "Close the windows if it starts to rain". This command may be received by a microphone installed on either user device 120 or smart home hub 134. Upon receiving this command, smart home system 100 may create a conditional mapping between data detected by sensors 128 and a window action to be performed by window functions 122 such that smart windows 102 may be caused to close in response to determining by sensors 128 that it is raining on the exterior side of smart windows 102 (e.g., using a camera, moisture sensor, etc.).

Figure 2:
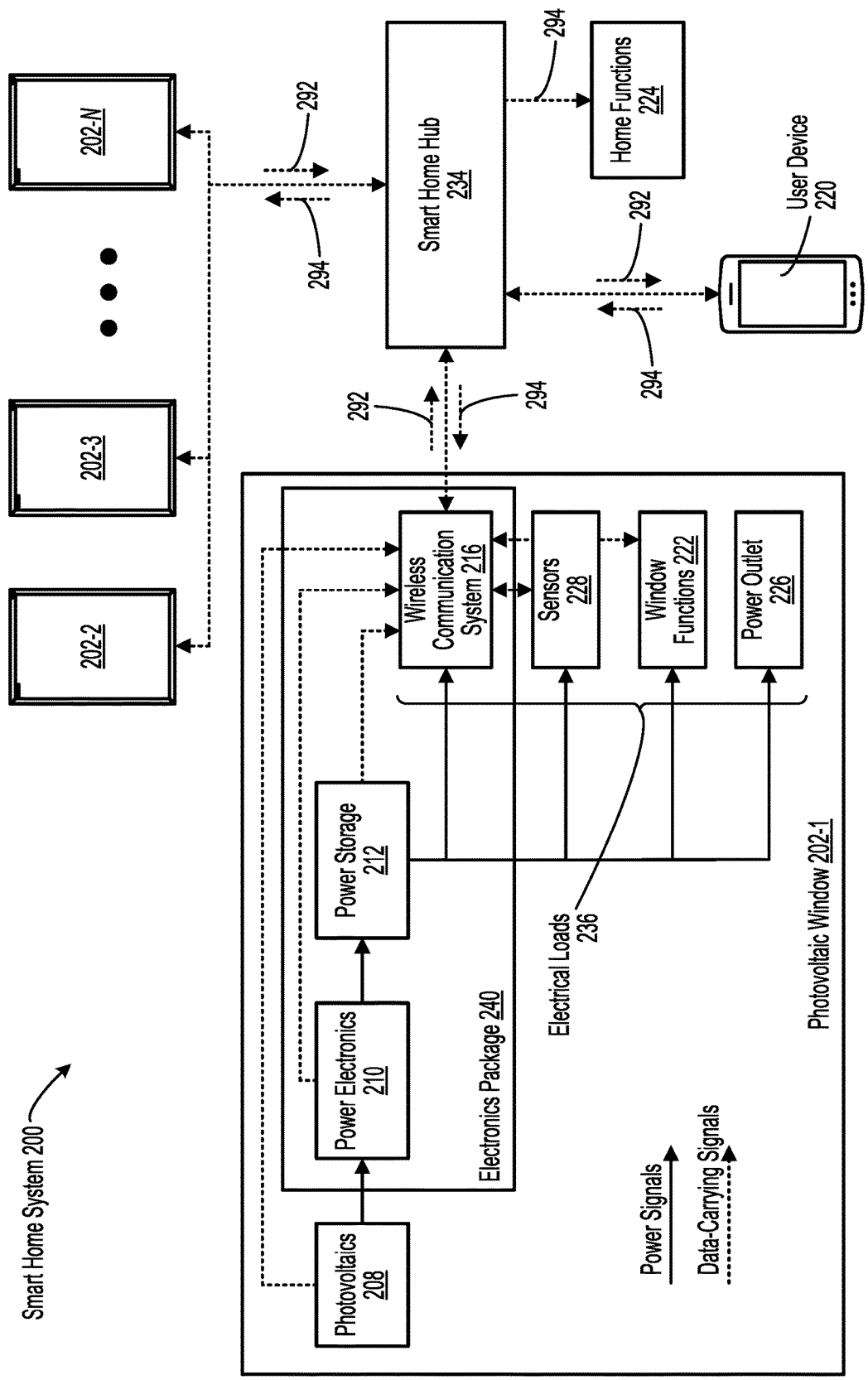
FIG. 2 illustrates a block diagram of an example smart home system having photovoltaic windows.

FIG. 2 illustrates a block diagram of an example smart home system 200, according to some embodiments. Smart home system 200 may include one or more (e.g., N) photovoltaic windows 202, which may each be separate, self-contained units capable of being self-powered. In the illustrated example, photovoltaic window 202-1 includes photovoltaics 208, power electronics 210, a power storage 212 (e.g., a battery), and one or more electrical loads 236 (including a wireless communication system 216, sensors 228, window functions 222, and a power outlet 226). Photovoltaic windows 202-2 to 202-N may include similar components. Smart home system 200 may further include a smart home hub 234, home functions 224, and a user device 220. The components of smart home system 200 may be interconnected via various power and/or data signals as shown in FIG. 2, with solid lines denoting power signals and dashed lines denoting data-carrying signals, which may include data signals 292, control signals 294, and the like.

In various embodiments, components of smart home system 200 may be more or less integrated than that shown in FIG. 2. For example, in some implementations, power electronics 210, power storage 212, and wireless communication system 216 may be packaged together on a single or multiple circuit boards on what is referred to herein as an electronics package 240. As another example, in some implementations, sensors 228 may include two separate modules, including an exterior sensor module positioned at and/or oriented toward an exterior side of the window and an interior sensor module positioned at and/or oriented toward an interior side of the window.

In some embodiments, photovoltaics 208 may generate and send electrical power to power electronics 210, which can control and regulate the manner, including the voltage and/or current, in which the electrical power is fed into power storage 212. Typically, power storage 212 (which may alternatively be referred to as "energy storage 212") may include one or more batteries and electronics for power conditioning. In some instances, power electronics 210 is able to maximize the power delivered from photovoltaics 208 to power storage 212 by matching the voltage of photovoltaics 208 to that of power storage 212.

In some embodiments, power electronics 210 conditions the variable output of photovoltaics 208 (variable voltage and current, depending on the lighting) and controls the output to a desired voltage/current acceptable for charging the batteries or powering the various sensors. This may be accomplished using an appropriate combination of buck converters, boost converters, and/or buck/boost converters, along with various active and/or passive circuit components, such as resistors, capacitors, inductors, transistors, transformers, and diodes, among other possibilities. In some instances, power electronics 210 may employ maximum power point tracking (MPPT) which may include adjusting the load to operate close to the maximum power point on the current-voltage curve of photovoltaics 208, which changes based on lighting condition. Other functions of power electronics 210 include, but are not limited to: managing battery charging/battery draw, conditioning input/output from batteries according to battery specs and safety requirements, and implementing a microcontroller integrated circuit (IC) to run algorithms, such as the MPPT.

The power held by power storage 212 can be used to power each of electrical loads 236. Although FIG. 2 illustrates smart home system 200 as driving all of the powered elements using power from power storage 212, this is not required by the present invention and a combination of power provided directly from photovoltaics 208, directly from power electronics 210, and/or power provided directly from power storage 212 can be utilized to power the various system components. In typical operation, power generated by photovoltaics 208 will be characterized by low current level over an extended period of time while power drawn by devices will be characterized by high current levels for short periods of time. Thus, in some embodiments, power storage 212 may be continually topped off by power delivered through power electronics 210 and may be drained by one or more of electrical loads 236 to meet the power requirements of the various devices.

Each of photovoltaic windows 202 may include a wireless communication system 216 that serves as the wireless interface for communicating between the electronics at photovoltaic windows 202 and external components, such as smart home hub 234, user device 220, and home functions 224. While FIG. 2 shows wireless communication system 216 as communicating with user device 220 indirectly via smart home hub 234, in some embodiments direct wireless communication between wireless communication system 216 and user device 220 may be enabled. Each of wireless communication system 216, smart home hub 234, user device 220, and home functions 224 may comply with one or more wireless standards, including IEEE 802.11 standards, Bluetooth standards, Zigbee standards, 3G, 4G/LTE, WiFi, and the like.

Each of photovoltaic windows 202 may also include one or more sensors 228 for capturing various types of sensor data. Without limitation, sensors 228 may include an interior- and/or exterior-facing camera, an interior- and/or exterior-facing light sensor, an interior- and/or exterior-facing motion sensor, an interior and/or exterior temperature sensor, an interior and/or exterior humidity sensor, an interior and/or exterior accelerometer, an interior and/or exterior contact sensor, an interior and/or exterior audio sensor, an interior and/or exterior moisture sensor, an interior and/or exterior air quality sensor, an interior and/or exterior smoke sensor, a leak sensor for detecting argon or krypton gas leaking from within the IGU, a parts per million (PPM) gas sensor, and the like.

Each of photovoltaic windows 202 may also include one or more window functions 222, which may be devices configured to consume the electrical power generated at the smart window to perform a particular action at the window (or "window action"). Without limitation, window functions 222 may include a window opening/closing mechanism, a window locking/unlocking mechanism, electric blinds, an electrochromic device integrated with the window glass, a polymer-dispersed liquid crystals (PDLC) film, a speaker, a microphone, lighting such as LED strip or edge lighting, a transparent organic light-emitting diode (OLED) display integrated with the window glass, and the like.

As an example operation of photovoltaic window 202 utilizing window functions 222 in conjunction with sensors 228, a light sensor integrated into and powered by photovoltaic window 202 could detect that light over a brightness threshold is passing through the smart window. In order to decrease the light passing through photovoltaic window 202, which could potentially heat up the room in which photovoltaic window 202 is installed, and the home as a result in residential applications, the window shades could be lowered to reduce the light passing through the smart window system and reduce the cooling costs of the home.

Each of photovoltaic windows 202 may also include one or more power outlets 226 for transferring electrical power. For example, power outlet 226 may serve as a port for providing power (e.g., charging) to various devices from power storage 212 or power electronics 210. In some embodiments, power outlet 226 may include a USB receptacle that provides USB charging functionality to various devices. In some embodiments, power outlet 226 can be used to charge the batteries of power storage 212 by connecting an external power source to power outlet 226, thereby causing photovoltaic window 202 to receive electrical power from an external source. In one example, on cloudy days with little sunlight, an external power source (e.g., a portable charger such as a USB power bank) can be connected to power outlet 226 to charge the batteries contained in power storage 212.

In addition to power used to power local sensors 228 and other electrical loads 236, a dedicated power outlet 226 in one of many different form factors can be provided to power window functions 222 or other components installed onto photovoltaic window 202. As an example, a USB outlet can be provided that can provide power to operate window shades that are mounted on photovoltaic window 202.

Data from sensors 228 as well as photovoltaics 208, power electronics 210, and power storage 212 can be used to implement control of the various features and functions described herein. For example, such data may be provided to a central processing unit (CPU) (not shown) of photovoltaic window 202 to be processed to provide control, for example, in conjunction with wireless communication system 216, for the devices implementing the various features and functions described herein. In some embodiments, such data may be sent to smart home hub 234 and/or user device 220 (via wireless communication system 216) in a data signal 292. These devices may receive data signal 292 and may generate control signals 294 to implement the various features and functions described herein.

The above-referenced data that may be included in data signal 292 may include data captured by sensors 228, which may be referred to as "sensor data", as well as data provided by photovoltaics 208, power electronics 210, and/or power storage 212, which may be referred to as "power data", which can include data on the state of photovoltaics 208, including current levels, voltage levels, and the like. The power data can then be used to track energy output as a function of time that can be used by various system components. The power data and the sensor data may be analyzed by the onboard processor of photovoltaic window 202, by smart home hub 234, and/or by user device 220. In some instances, smart home hub 234 may receive, through data signal 292, the power data from the batteries of power storage 212 themselves. Such data may indicate a state of charge of the batteries, a charging status of the batteries, or a current output of photovoltaics 208, among other possibilities.

The data received by smart home hub 234 and/or user device 220 can be used to control one or more home functions 224, which may be devices configured to perform particular actions within the home (or "home actions"). Without limitation, home functions 224 may include room lighting, exterior lighting, home heating system, home cooling system, home appliances, door locks, audio systems, and the like. Corresponding home actions may include, for example, turning on, off, or dimming the room or exterior lighting, turning on or off the home heating or cooling system, locking or unlocking a door, turning on, off, or controlling the audio system in a more specific manner, and the like.

As an example operation of smart home system 200 utilizing home functions 224 in conjunction with sensors 228, on warm summer days, as the light intensity measured at the smart window system increases or a temperature measured at the smart window system increases (as measured by photovoltaics 208 and/or sensors 228 and communicated to smart home hub 234 via wireless communication system 216), the home cooling system could be turned on in anticipation of increased cooling demand before the temperature in the home begins to increase. Alternatively, if clouds begin to decrease the light intensity or temperature measured at the smart window system, the home cooling system can be turned off in response to this decrease in measured light intensity or temperature, providing additional inputs to the home cooling system that will enable finer control of the home cooling system and resulting reductions in energy consumption. Similar functionality can be provided in relation to a home heating system.

Embodiments of the present invention are particularly applicable to residential window applications, although commercial applications are also included within the scope of the present invention. As described herein, power that is generated by the smart window can be utilized by the smart window and by components, for example, window shades, that are mounted on or in proximity of the smart window. Thus, in addition to generating power that can be fed into the power grid and utilized to offset energy consumption in the building that includes smart home system 200, the smart window itself can utilize generated power to power features that are not available in conventional windows. The features that can be provided by embodiments of the present invention span a wide variety of functions, including electrochromic control to modify the tint state of the IGU, surveillance functions enabled by cameras, temperature control functions enabled by temperature sensors, window shade control functions enabled by light sensors, and the like. Thus, smart home systems described herein enable internet-of-things (TOT) functionality without the need to provide power to one or more of the TOT devices.

As described herein, smart window systems are provided that include a number of self-powered features, both interior and exterior, including, but not limited to camera function, motion sensor function, light sensor function, temperature sensor function, humidity sensor function, contact function, for example, intrusion detection using an accelerometer that can alert a user to people or items making contact with the smart window system, communication and indication functions, for example, LED indicators to provide information to a user on the status of various system elements, and the like. Embodiments of the present invention provide functions and features that are not found in conventional windows, because conventional windows do not include a power source that can be used to power devices providing these functions and features. As a result, embodiments of the present invention provide features and functions that can be integrated into a smart window system while also being powered by power generated by the smart window system.

In contrast with a conventional window that would require an external power source to provide these features, embodiments of the present invention, but using power generated by photovoltaics 208 disposed in the IGU, do not need any external wiring, which can result in lack of mechanical integrity, breaking of atmospheric seals, and the like if an attempt to integrate such external wiring into an IGU was attempted. The integration of a power source and sensors 228 inside the IGU enables functionality not available using conventional systems. As an example, in addition to intrusion detection, an accelerometer can be used to detect interaction between a user and the window, including the lites and the frame. Tapping on the lite in accordance with a predetermined pattern could be used to generate sensor data that sends a notification, causes a window action to be performed by a window function 222 (e.g., open a window), or causes a home action to be performed by a home function 224 (e.g., open a lock), and the like.

Figure 3A:
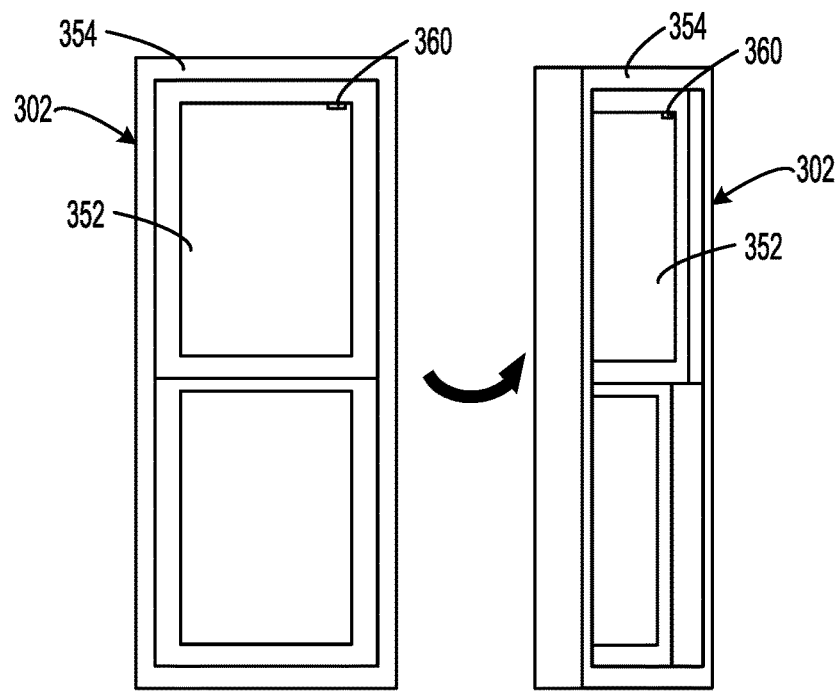
FIG. 3A illustrates front and angled views of an exterior side of a photovoltaic window having a frame and an IGU.

FIG. 3A illustrates front (left) and angled (right) views of an exterior side of a photovoltaic window 302 having a frame 354 and an IGU 352, according to some embodiments. In the illustrated examples, photovoltaic window 302 is a vertical sliding window. Photovoltaic window 302 includes an exterior sensor module 360 that is shown coupled to IGU 352.

Figure 3B:
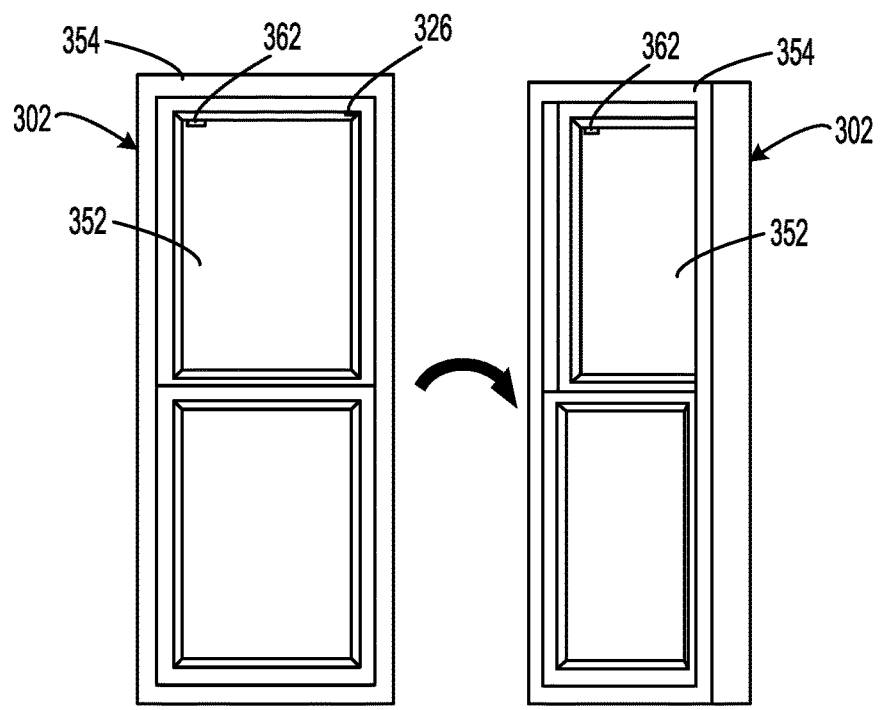
FIG. 3B illustrates front and angled views of an interior side of photovoltaic window having a frame and an IGU.

FIG. 3B illustrates front (left) and angled (right) views of an interior side of photovoltaic window 302 having frame 354 and IGU 352, according to some embodiments. Photovoltaic window 302 includes an interior sensor module 362 that is shown coupled to IGU 352, as well as a power outlet 326, which is a USB-C outlet in the illustrated examples.

Figure 3C:
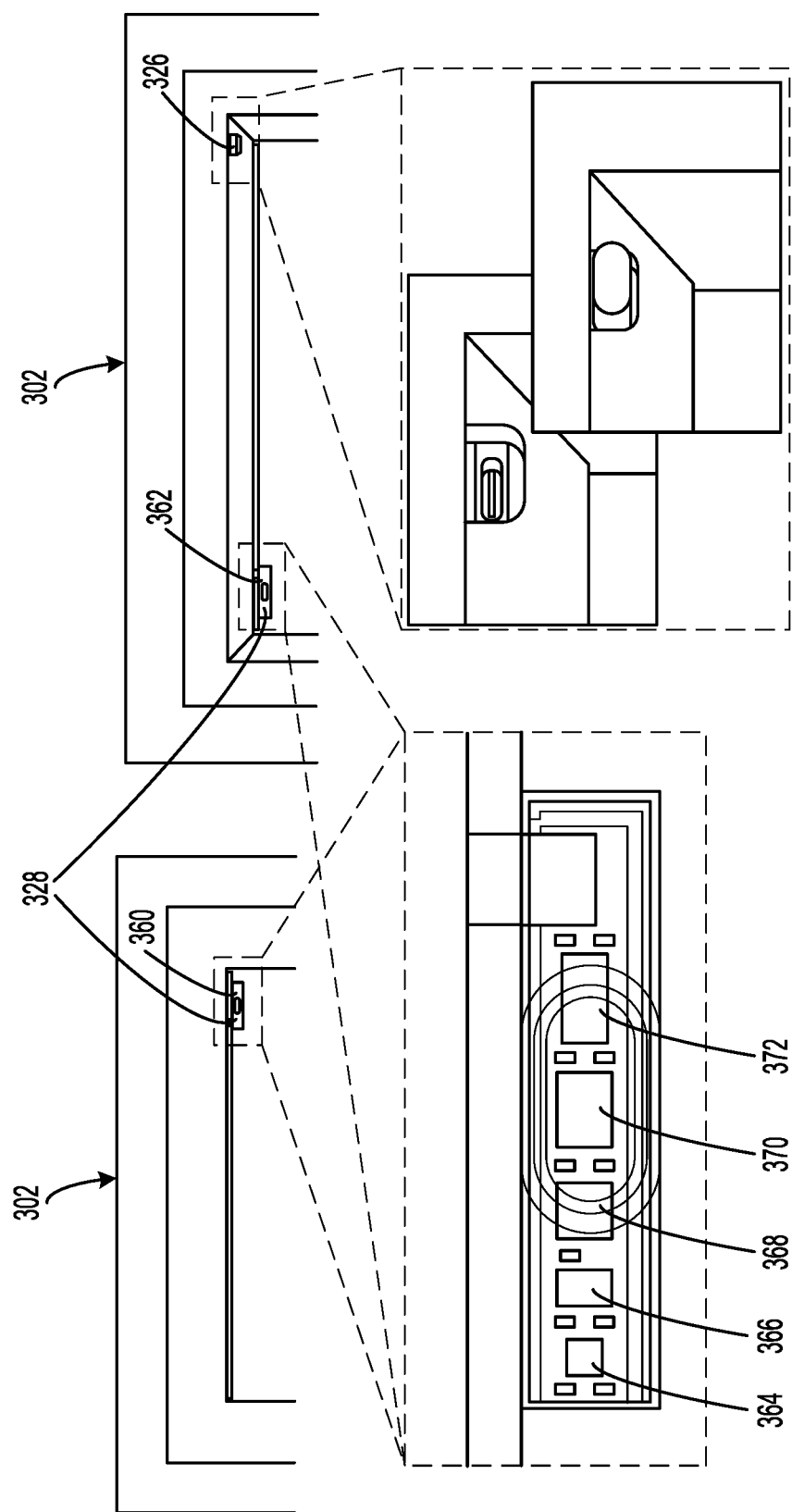
FIG. 3C illustrates zoomed-in views of portions of a photovoltaic window.

FIG. 3C illustrates zoomed-in views of portions of photovoltaic window 302, according to some embodiments. In FIG. 3C, a zoomed-in version of elements shown in FIGS. 3A and 3B is provided that shows the individual sensors of exterior sensor module 360 and interior sensor module 362, which collectively form sensors 328 of photovoltaic window 302. Each of these sensor modules includes an accelerometer 364, a temperature sensor 366, a humidity sensor 368, a camera 370, and a light sensor 372. These sensors are merely exemplary and other sensors and combinations of sensors can be utilized within the scope of the present invention. As described herein, embodiments of the present invention utilize power generated by photovoltaics 208, either directly or via power storage 212 to power various sensors and other electrical loads.

Figure 4:
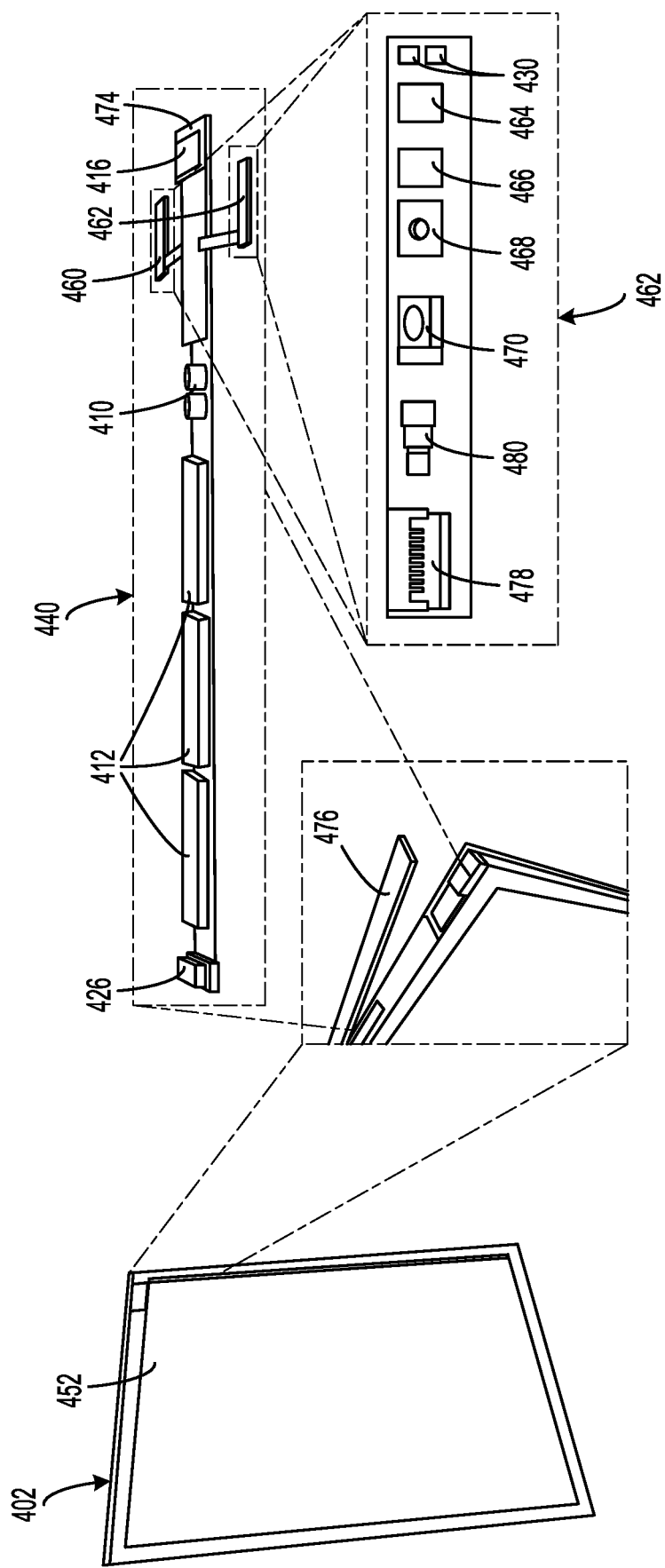
FIG. 4 illustrates a photovoltaic window having an IGU.

FIG. 4 illustrates a photovoltaic window 402 having an IGU 452, according to some embodiments. FIG. 4 further illustrates (via insets) certain components of photovoltaic window 402 shown separated from IGU 452. In the illustrated example, photovoltaic window 402 includes an electronics package 440 that includes a power outlet 426, power storage 412 (comprising a bank of batteries), power electronics 410, exterior sensor module 460, interior sensor module 462, wireless communication system 416, and photovoltaic input 474. Photovoltaic input 474 receives power generated by the photovoltaic coatings present on the lites. Additional description related to organic photovoltaic coatings is provided in commonly assigned U.S. Patent Application No. 2019/0036480, the disclosure of which is hereby incorporated by reference in its entirety for all purposes.

In the various embodiments described herein, the term "electronics package" may refer to the group of electrical components contained in the electronics package (e.g., the circuit board and components attached thereto) as well as the casing, packaging, coverings, and/or box in which the group of electrical components are contained. In some implementations, the electronics package can include a box with a cover that provide insulation and waterproofing for the electrical components. The cover may further provide access to the electrical components for maintenance and/or replacement of the electrical components.

Electronics package 440 can be implemented on a printed circuit board (PCB) that is mounted in the photovoltaic window, as described more fully in relation to FIGS. 8A-9F. In contrast with conventional windows, embodiments of the present invention integrate power and electronic devices, for example, electronics package 440, inside IGU 452 to provide a self-contained photovoltaic window system that provides both electronic and optical functionality. By integrating the electronics into the IGU, embodiments of the present invention can be utilized with a wide variety of framing systems, typically requiring no modification of the framing system. As a result, the IGU with electronics can be used as a drop-in replacement for conventional IGUs in standard window frames. Therefore, embodiments of the present invention provide augmented IGUs that can include batteries, circuits, sensors, antennas, and the like that can be mounted in standard window frames to form the photovoltaic window system. In the embodiment illustrated in FIG. 4, electronics package 440 is mounted in the upper portion of IGU 452 and is sealed via a cover 476 to provide a controlled environment.

In order to provide for integration with IGU 452, the form factor of electronics package 440 may correspond to the shape of the upper portion of IGU 452, in this case, a width on the order of 10 mm and a length on the order of 50 cm. In various implementations, electronics package 440 may have a wide variety of sizes and form factors. For example, electronics package 440 (or the casing, packaging, or box in which the electronics package is contained) may have a width similar to the width of the IGU's spacer, i.e., between 0.25 to 0.5 inches. In some implementations, electronics package 440 may have a width similar to the width of the entire IGU, i.e., between 0.5 to 1.0 inches. The length of electronics package 440 may be based on the length of the IGU, which may vary from window to window (e.g., 2 feet, 3 feet, 4 feet, etc.).

In some embodiments, each of exterior sensor module 460 and interior sensor module 462 includes a connector 478 (for transferring power and data to/from other components of electronics package 440), a light 480, a camera 470, a humidity sensor 468, a temperature sensor 466, an accelerometer 464, and LEDs 482. Although exterior sensor module 460 and interior sensor module 462 share common elements in this embodiment, this is not required by the present invention and exterior sensor module 460 and interior sensor module 462 can include different elements, sensors, and the like. Accordingly, a camera may be included on the exterior sensor module, but not on the interior sensor module, whereas a temperature sensor may be included in both the exterior sensor module and the interior sensor module. In some embodiments, exterior sensor module 460 and interior sensor module 462 may be bonded to an exterior side and an interior side of the glass of IGU 452, respectively. Ribbon cables or other suitable connectors can be utilized to connect exterior sensor module 460 and interior sensor module 462 to other elements of electronics package 440.

FIG. 5A illustrates a perspective view of photovoltaic window 502 having an IGU 552 integrated with an electronics package 540, according to some embodiments. Photovoltaic window 502 further includes an interior sensor module 562 positioned on the interior side of IGU 552 and an exterior sensor module (barely visible through glass of IGU 552 in FIG. 5A) positioned on the exterior side of IGU 552. In the illustrated example, interior sensor module 562 includes a camera 570 for monitoring the interior of a home or building.

FIG. 5B illustrates a zoomed-in version of FIG. 5A showing photovoltaic window 502, IGU 552, and electronics package 540, according to some embodiments. As illustrated in FIG. 5B, interior sensor module 562 mounts on the interior side of the interior glass of IGU 552 and is electrically connected to the electronics package via an electronic cable that extends upward toward electronic package 540. Electronics package 540 is shaped to seamlessly integrate with the top portion of IGU 552, allowing embodiments of the present invention to be used with existing IGUs. In the illustrated example, photovoltaic window 502 further includes a power outlet 526 positioned on the interior side of electronics package 540 to provide transfer of the power generated at photovoltaic window 502 to one or more window functions, home functions, or to any remote electrical device (e.g., a user's smart phone).

FIG. 5C illustrates an exploded, perspective view of photovoltaic window 502 including IGU 552 and electronics package 540, according to some embodiments. Components of IGU 552 are more clearly shown in FIG. 5C, and include an interior glass 584, an exterior glass 586, and a seal 544 positioned between interior glass 584 and exterior glass 586. When photovoltaic window 502 is assembled, an exterior sensor module 560 is mounted on an exterior side of exterior glass 586 and interior sensor module 562 is mounted to an interior side of interior glass 584. Also shown in FIG. 5C are electrical leads 588 connecting the photovoltaics of photovoltaic window 502 to electronics package 540. Electrical leads 588 may be positioned such that they can be connected to a photovoltaic input positioned on the bottom side of electronics package 540 when electronics package 540 is mounted in the top side of IGU 552. In this example, electronics package 540 includes a portion disposed between the lites and a portion above the lites to provide access to the USB power port of power outlet 526.

Figure 6B:
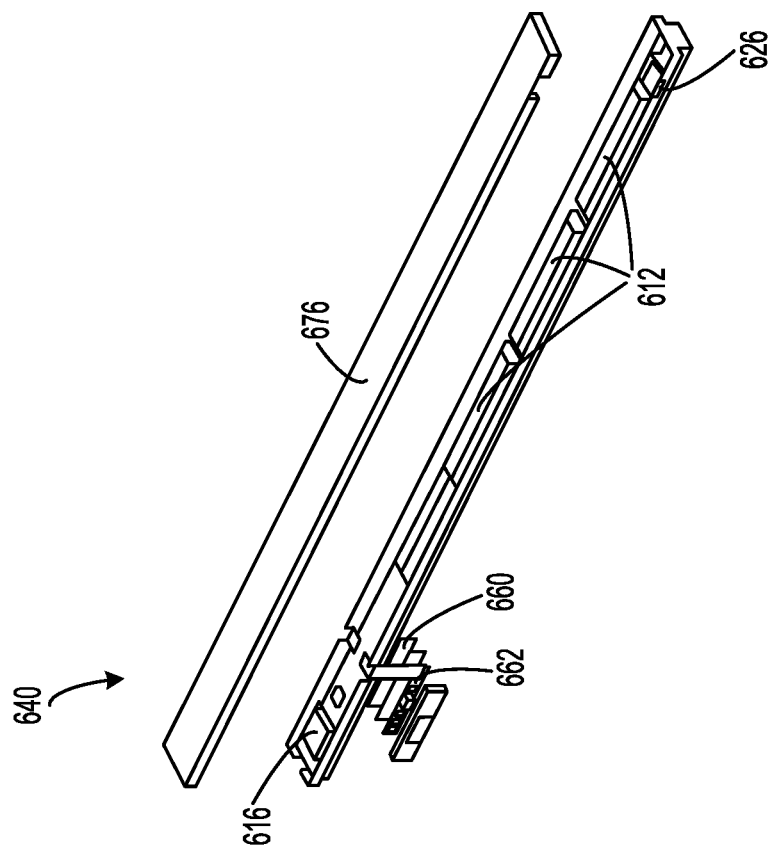
FIG. 6B illustrates an exploded, perspective view of an electronics package.
Figure 6A:
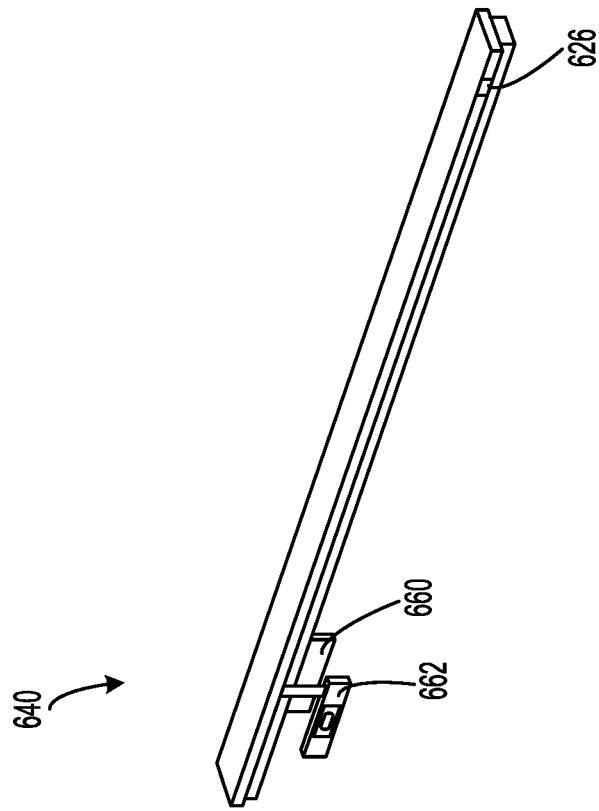
FIG. 6A illustrates a perspective view of an electronics package of a photovoltaic window.

FIG. 6A illustrates a perspective view of an electronics package 640 of a photovoltaic window, according to some embodiments. Electronics package 640 illustrated in FIG. 6A may be similar to electronics packages described previously in reference to FIGS. 4-5C. For example, electronics package 640 includes an interior sensor module 662, an exterior sensor module 660, and a power outlet 626.

FIG. 6B illustrates an exploded, perspective view of electronics package 640, according to some embodiments. Specifically, a cover 676 is removed from the top side of electronics package 640 as well as covers for interior sensor module 662 and exterior sensor module 660. Visible in FIG. 6B are a power storage 612 (comprising a bank of batteries), wireless communication system 616, among other components.

Figure 6D:
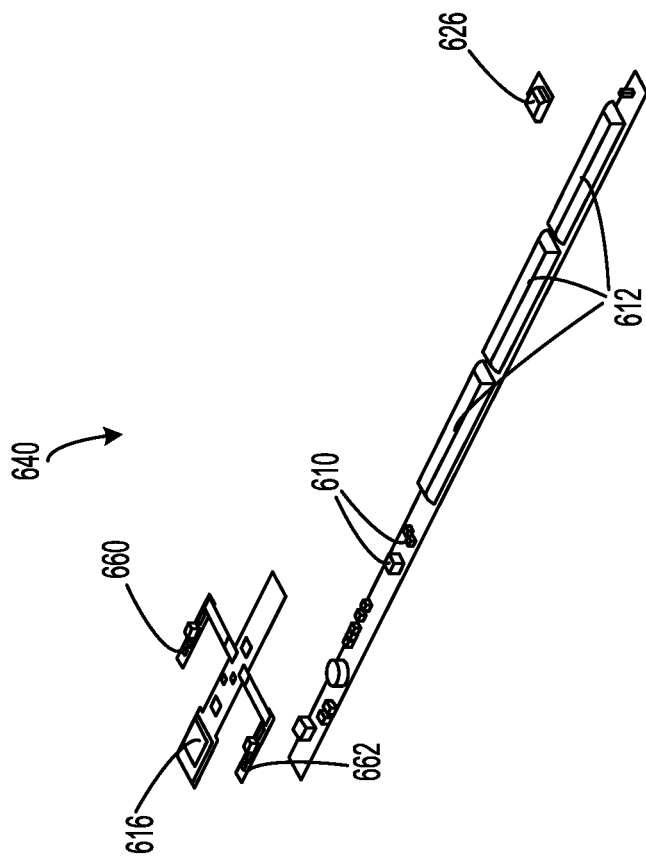
FIG. 6D illustrates an exploded, perspective view of an electronics package with all covers and casings removed.
Figure 6C:
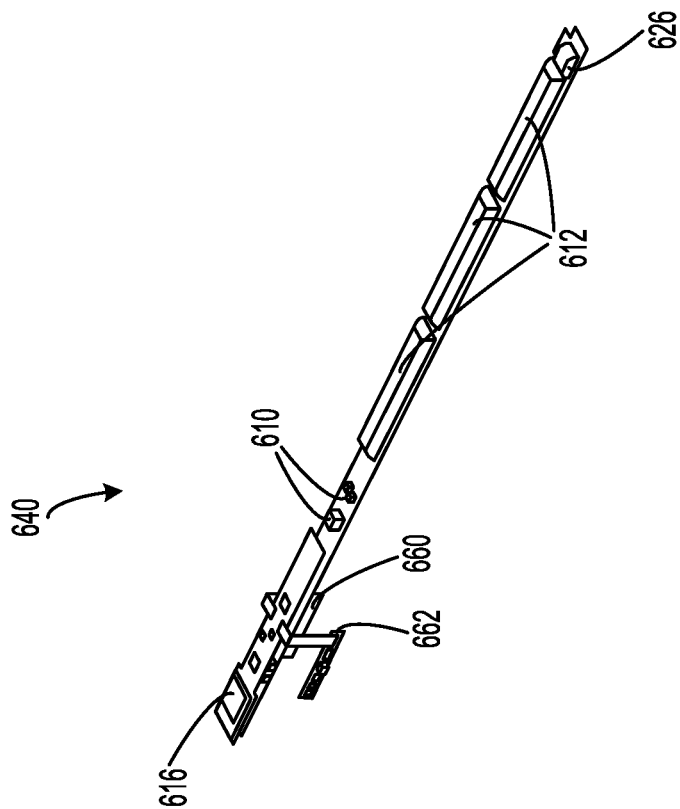
FIG. 6C illustrates a perspective view of an electronics package with all covers and casings removed.

FIG. 6C illustrates a perspective view of electronics package 640 with all covers and casings removed, according to some embodiments. Further visible in FIG. 6C are power electronics 610, as well as various data processing and storage elements placed throughout electronics package 640.

FIG. 6D illustrates an exploded, perspective view of electronics package 640 with all covers and casings removed, according to some embodiments. FIG. 6D shows how certain components of electronics package 640, such as interior sensor module 662, exterior sensor module 660, and wireless communication system 616, can be fabricated on a separate circuit board form other components, such as power electronics 610 and power storage 612. Such separation can simplify the manufacturing process by allowing components that are more user-customizable (e.g., sensor modules) to be fabricated separately from components that are fairly standard across products (e.g., power electronics and storage). In some embodiments, the lower board in FIG. 6D may be referred to as the "power electronics board" and the upper board may be referred to as the "smart board".

Figure 7B:
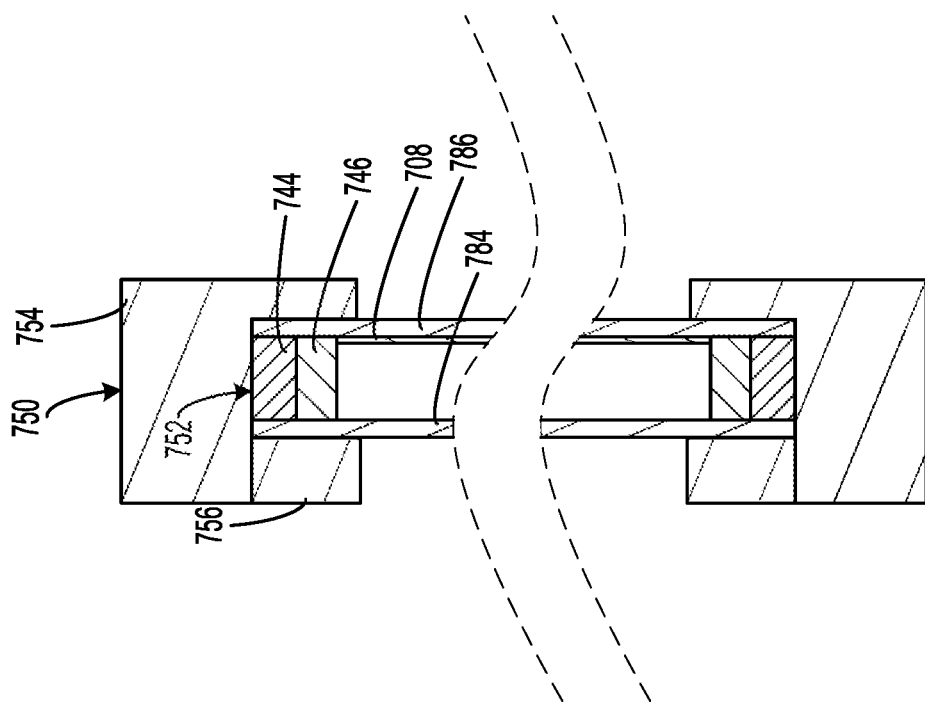
FIG. 7B illustrates a side view of an IGU and a window frame assembly in an assembled state.
Figure 7A:
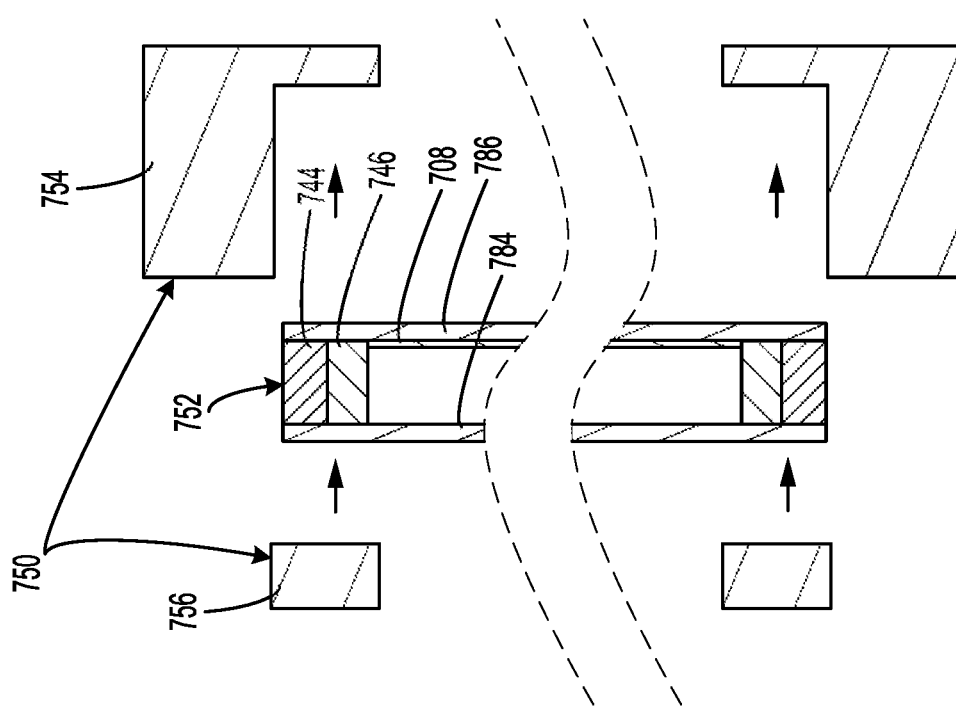
FIG. 7A illustrates a side view of an IGU and a window frame assembly in an unassembled state.

FIG. 7A illustrates a side view of an IGU 752 and a window frame assembly 750 in an unassembled state, according to some embodiments. IGU 752 includes a seal 744, a spacer 746, a photovoltaic 708, an interior glass 784, and an interior glass 784. In the illustrated example, photovoltaic 708 is coupled to exterior glass 786, and each of seal 744 and spacer 746 are positioned between and coupled to exterior glass 786 and interior glass 784. Window frame assembly 750 includes a window frame 754 and a glazing stop 756 (alternatively referred to as a "frame stop").

FIG. 7B illustrates a side view of IGU 752 and window frame assembly 750 in an assembled state, according to some embodiments. After IGU 752 is inserted into the window frame 754, glazing stop 756 is used to secure IGU 752 in place.

FIG. 8A illustrates a side view of a photovoltaic window 802A that includes (1) an IGU 852 integrated with components of a photovoltaic window system and (2) a window frame assembly 850 in an assembled state, according to some embodiments. IGU 852 includes a seal 844, a spacer 846, an interior glass 884, and an exterior glass 886. Window frame assembly 850 includes a window frame 854 and a glazing stop 856. The photovoltaic window system includes an electronics package 840 and a photovoltaic 808. In the illustrated example, electronics package 840 is disposed above IGU 852 such that electronics package 840 is disposed above each of seal 844, interior glass 884, and exterior glass 886. Electronics package 840 can be considered to be an appendage of IGU 852 and can have a similar width as IGU 852. One advantage of photovoltaic window 802A is that electronics package 840 can be easily accessed by removing glazing stop 856. In some instances (such as in the illustrated example), spacer 846 and a portion of seal 844 may be partially visible in the vision area (the visible portion) of photovoltaic window 802A. In other examples, window frame 854 may be configured to extend further downward vertically so as to cover spacer 846 and/or seal 844.

FIG. 8B illustrates a side view of a photovoltaic window 802A that includes (1) IGU 852 integrated with components of a photovoltaic window system and (2) window frame assembly 850 in an assembled state, according to some embodiments. IGU 852 includes seal 844, spacer 846, interior glass 884, and exterior glass 886. Window frame assembly 850 includes window frame 854 and glazing stop 856. The photovoltaic window system includes electronics package 840 and photovoltaic 808. In the illustrated example, electronics package 840 is disposed within IGU 852 at a position between interior glass 884 and exterior glass 886 and adjacent to seal 844, which can be reduced in thickness in comparison to conventional seals. During manufacturing, seal 844 can be thinner on one edge in order to receive electronics package 840 while being thicker (e.g., a standard thickness) on the other edges. Thus, this design is easily integrated into standard manufacturing processes. Electronics package 840 can be considered to be a top load of IGU 852 and can have a similar width as seal 844 and/or spacer 846. In some instances (such as in the illustrated example), a portion of spacer 846 may be partially visible in the vision area (the visible portion) of photovoltaic window 802B, while in other embodiments window frame 854 may extend further downward vertically.

FIG. 8C illustrates a side view of a photovoltaic window 802C that includes (1) IGU 852 integrated with components of a photovoltaic window system and (2) window frame assembly 850 in an assembled state, according to some embodiments. IGU 852 includes seal 844, spacer 846, interior glass 884, and exterior glass 886. Window frame assembly 850 includes window frame 854 and glazing stop 856. The photovoltaic window system includes electronics package 840 and photovoltaic 808. In the illustrated example, electronics package 840 is disposed partially above IGU 852 and partially within IGU 852. The portion of electronics package 840 that is disposed above IGU 852 is disposed above each of seal 844, interior glass 884, and exterior glass 886 while the portion of electronics package 840 that is disposed within IGU 852 is disposed at a position between interior glass 884 and exterior glass 886 and adjacent to seal 844. In some instances (such as in the illustrated example), a portion of spacer 846 may be partially visible in the vision area (the visible portion) of photovoltaic window 802C, while in other embodiments window frame 854 may extend further downward vertically.

FIG. 8D illustrates a side view of a photovoltaic window 802D that includes (1) IGU 852 integrated with components of a photovoltaic window system and (2) window frame assembly 850 in an assembled state, according to some embodiments. IGU 852 includes seal 844, spacer 846, interior glass 884, and exterior glass 886. Window frame assembly 850 includes window frame 854 and glazing stop 856. The photovoltaic window system includes electronics package 840 and photovoltaic 808. In the illustrated example, electronics package 840 is disposed asymmetrically above a portion of IGU 852 at a position that is above exterior glass 886 and seal 844 but not interior glass 884. Thus, the area of the exterior glass 886 is larger than the area of interior glass 884, resulting in a cavity on the interior side of the IGU. This design provides for a larger seal on the exterior side of the frame. Removal of glazing stop 856 enables access to electronics package 840 without removing the IGU from the frame. This can be useful if batteries need to be replaced, electronics need to be serviced, or the like during the life of the photovoltaic window system. In some instances (such as in the illustrated example), spacer 846 and a portion of seal 844 may be partially visible in the vision area (the visible portion) of photovoltaic window 802D, while in other embodiments window frame 854 may extend further downward vertically.

FIG. 8E illustrates a side view of a photovoltaic window 802E that includes (1) IGU 852 integrated with components of a photovoltaic window system and (2) window frame assembly 850 in an assembled state, according to some embodiments. IGU 852 includes seal 844, spacer 846, interior glass 884, and exterior glass 886. Window frame assembly 850 includes window frame 854 and glazing stop 856. The photovoltaic window system includes electronics package 840 and photovoltaic 808. In the illustrated example, electronics package 840 is disposed within IGU 852 at a position between interior glass 884 and exterior glass 886 and between seal 844 and spacer 846. Electronics package 840 can have a similar width as seal 844 and/or spacer 846. In some instances (such as in the illustrated example), spacer 846 and a portion of electronics package 840 may be partially visible in the vision area (the visible portion) of photovoltaic window 802E, while in other embodiments window frame 854 may extend further downward vertically.

FIG. 8F illustrates a side view of a photovoltaic window 802F that includes (1) IGU 852 integrated with components of a photovoltaic window system and (2) window frame assembly 850 in an assembled state, according to some embodiments. IGU 852 includes seal 844, spacer 846, interior glass 884, and exterior glass 886. Window frame assembly 850 includes window frame 854 and glazing stop 856. The photovoltaic window system includes electronics package 840 and photovoltaic 808. In the illustrated example, electronics package 840 is disposed within IGU 852 at a position that is within and/or internal to spacer 846 (e.g., embedded in spacer 846). In some instances (such as in the illustrated example), none of seal 844, spacer 846, and electronics package 840 may be partially visible in the vision area (the visible portion) of photovoltaic window 802F, while in other embodiments window frame 854 may extend further upward vertically.

Figure 8H:
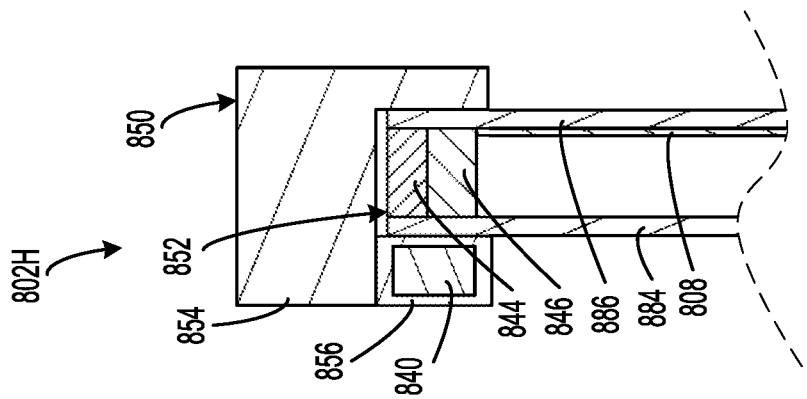
FIG. 8H illustrates a side view of a photovoltaic window.
Figure 8G:
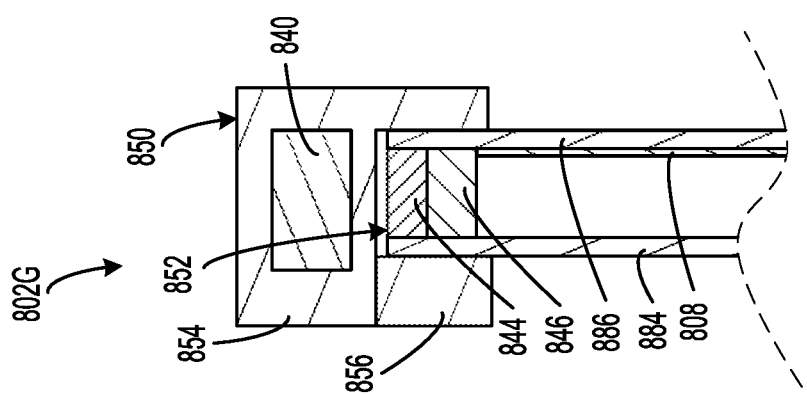
FIG. 8G illustrates a side view of a photovoltaic window.

FIG. 8G illustrates a side view of a photovoltaic window 802G that includes (1) IGU 852 and (2) window frame assembly 850 integrated with components of a photovoltaic window system and in an assembled state, according to some embodiments. IGU 852 includes seal 844, spacer 846, interior glass 884, and exterior glass 886. Window frame assembly 850 includes window frame 854 and glazing stop 856. The photovoltaic window system includes electronics package 840 and photovoltaic 808. In the illustrated example, electronics package 840 is disposed within window frame 854 at a position that is within and/or internal to window frame 854 (e.g., embedded in window frame 854). In some instances, none of seal 844, spacer 846, and electronics package 840 may be visible in the vision area (the visible portion) of photovoltaic window 802G, while in other embodiments window frame 854 may extend further upward vertically. In some embodiments, window frame 854 may include a removable portion (e.g., on the interior side of window frame 854) that provides an access point for electronics package 840.

FIG. 811 illustrates a side view of a photovoltaic window 802H that includes (1) IGU 852 and (2) window frame assembly 850 integrated with components of a photovoltaic window system and in an assembled state, according to some embodiments. IGU 852 includes seal 844, spacer 846, interior glass 884, and exterior glass 886. Window frame assembly 850 includes window frame 854 and glazing stop 856. The photovoltaic window system includes electronics package 840 and photovoltaic 808. In the illustrated example, electronics package 840 is disposed within glazing stop 856 at a position that is within and/or internal to glazing stop 856 (e.g., embedded in glazing stop 856). In some instances, none of seal 844, spacer 846, and electronics package 840 may be visible in the vision area (the visible portion) of photovoltaic window 802H, while in other embodiments window frame 854 may extend further downward vertically. In some embodiments, glazing stop 856 may include a removable portion (e.g., on the interior side of glazing stop 856) that provides an access point for electronics package 840.

Many variations and modifications to the examples described in FIGS. 8A-8H exist and are considered to be within the scope of the present disclosure. For example, the electronics package cross section can be positioned linearly along one of the window or spacer edges. As another example, the electronics package cross section can be positioned in a corner of the IGU occupying two edges (either as triangle or rectangle). As yet another example, for embodiments in which the electronics package occupies the spacer volume, such as that shown in FIG. 8F, the electronics package can take the form of either being within the spacer itself or within a connector that joins the spacer together. While not explicitly shown in FIGS. 8A-8H, it is to be understood that electrical wires may traverse between different components of photovoltaic windows 802, such as between photovoltaics 808 and electronics packages 840.

FIG. 9A illustrates a side view of a photovoltaic window 902A that includes (1) an IGU 952 integrated with components of a photovoltaic window system and (2) a window frame assembly 950 in an assembled state, according to some embodiments. IGU 952 includes a seal 944, a spacer 946, an interior glass 984, and an exterior glass 986. Window frame assembly 950 includes a window frame 954 and a glazing stop 956. The photovoltaic window system includes an electronics package 940 and a photovoltaic 908. Photovoltaic window 902A is similar to photovoltaic window 802A and additionally shows a possible positioning of an exterior sensor module 960 and an interior sensor module 962. In the illustrated example, exterior sensor module 960 is mounted to an outer surface of exterior glass 986 and interior sensor module 962 is mounted to an outer surface of interior glass 984. Neither exterior sensor module 960 nor interior sensor module 962 further obscure the visible region of photovoltaic window 902A.

FIG. 9B illustrates a side view of a photovoltaic window 902B that includes (1) IGU 952 integrated with components of a photovoltaic window system and (2) window frame assembly 950 in an assembled state, according to some embodiments. IGU 952 includes seal 944, spacer 946, interior glass 984, and exterior glass 986. Window frame assembly 950 includes window frame 954 and glazing stop 956. The photovoltaic window system includes electronics package 940 and photovoltaic 908. Photovoltaic window 902B is similar to photovoltaic window 802B and additionally shows a possible positioning of an exterior sensor module 960 and an interior sensor module 962. In the illustrated example, exterior sensor module 960 is mounted to an outer surface of exterior glass 986 and interior sensor module 962 is mounted to an outer surface of interior glass 984.

FIG. 9C illustrates a side view of a photovoltaic window 902C that includes (1) IGU 952 integrated with components of a photovoltaic window system and (2) window frame assembly 950 in an assembled state, according to some embodiments. IGU 952 includes seal 944, spacer 946, interior glass 984, and exterior glass 986. Window frame assembly 950 includes window frame 954 and glazing stop 956. The photovoltaic window system includes electronics package 940 and photovoltaic 908. Photovoltaic window 902C is similar to photovoltaic window 802C and additionally shows a possible positioning of an exterior sensor module 960 and an interior sensor module 962. In the illustrated example, exterior sensor module 960 is mounted to an outer surface of exterior glass 986 and interior sensor module 962 is mounted to an outer surface of interior glass 984.

FIG. 9D illustrates a side view of a photovoltaic window 902D that includes (1) IGU 952 integrated with components of a photovoltaic window system and (2) window frame assembly 950 in an assembled state, according to some embodiments. IGU 952 includes seal 944, spacer 946, interior glass 984, and exterior glass 986. Window frame assembly 950 includes window frame 954 and glazing stop 956. The photovoltaic window system includes electronics package 940 and photovoltaic 908. Photovoltaic window 902D is similar to photovoltaic window 802D and additionally shows a possible positioning of an exterior sensor module 960. In the illustrated example, exterior sensor module 960 is mounted to an inner surface of exterior glass 986. Exterior sensor module 960 may be positioned so as to not further obscure the visible region of photovoltaic window 902D. An interior sensor module can be utilized as well.

FIG. 9E illustrates a side view of a photovoltaic window 902E that includes (1) IGU 952 integrated with components of a photovoltaic window system and (2) window frame assembly 950 in an assembled state, according to some embodiments. IGU 952 includes seal 944, spacer 946, interior glass 984, and exterior glass 986. Window frame assembly 950 includes window frame 954 and glazing stop 956. The photovoltaic window system includes electronics package 940 and photovoltaic 908. Photovoltaic window 902E is similar to photovoltaic window 802E and additionally shows a possible positioning of an exterior sensor module 960 and an interior sensor module 962. In the illustrated example, exterior sensor module 960 is mounted to an inner surface of exterior glass 986 and interior sensor module 962 is mounted to an inner surface of interior glass 984. Neither exterior sensor module 960 nor interior sensor module 962 further obscure the visible region of photovoltaic window 902E.

FIG. 9F illustrates a side view of a photovoltaic window 902F that includes (1) IGU 952 integrated with components of a photovoltaic window system and (2) window frame assembly 950 in an assembled state, according to some embodiments. IGU 952 includes seal 944, spacer 946, interior glass 984, and exterior glass 986. Window frame assembly 950 includes window frame 954 and glazing stop 956. The photovoltaic window system includes electronics package 940 and photovoltaic 908. Photovoltaic window 902F is similar to photovoltaic window 802F and additionally shows a possible positioning of an exterior sensor module 960 and an interior sensor module 962. In the illustrated example, exterior sensor module 960 is mounted to an inner surface of exterior glass 986 and interior sensor module 962 is mounted to an inner surface of interior glass 984.

Many variations and modifications to the examples described in FIGS. 9A-9F exist and are considered to be within the scope of the present disclosure. For example, while not explicitly shown in FIGS. 9A-9F, it is to be understood that electrical wires may traverse between different components of photovoltaic windows 902, such as between photovoltaics 908 and electronics packages 940, between interior sensor modules 962 and electronics packages 940, and between exterior sensor modules 960 and electronics packages 940. Certain embodiments, such as those shown in FIGS. 9D and 9E, may have exterior sensor modules 960 (and also interior sensor module 962 for FIG. 9E) integrated with electronics packages 940 (or the container of electronics packages 940) and may beneficially lack electrical wires connecting to these components.

Figure 10:
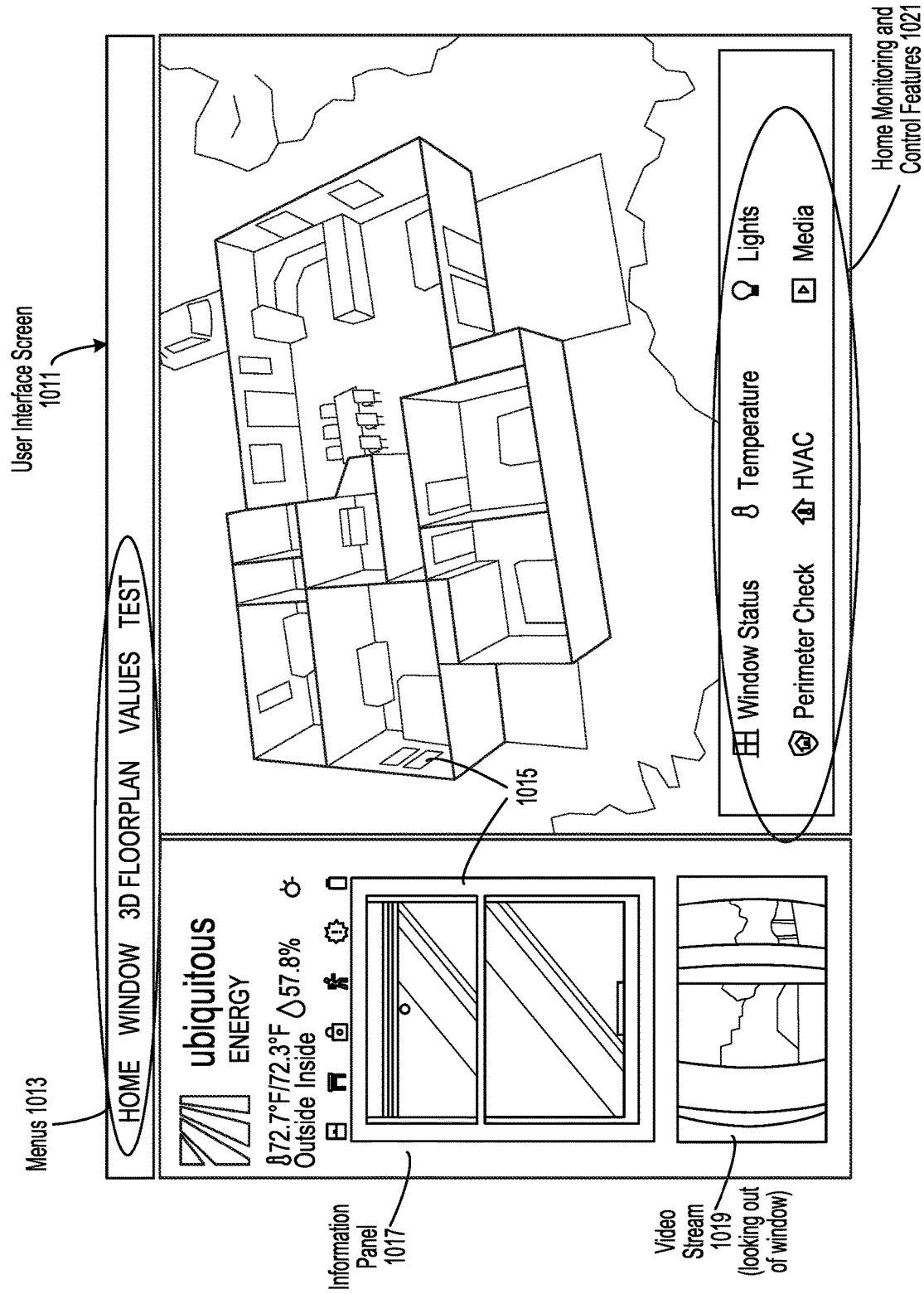
FIG. 10 illustrates an example of a user interface screen.

FIG. 10 illustrates an example of a user interface screen 1011, according to some embodiments. As described herein, a user device may provide a user interface to facilitate user access and interaction with the home automation system. While FIG. 10 describes a graphical user interface, it is to be understood that other user interfaces can also be substituted. In some embodiments, user interface screen 1011 can occupy the entire display area of the user device (e.g., if user device is a mobile phone or other device with a relatively small display). In other embodiments, user interface screen 1011 can occupy a portion of the display area (e.g., a window or pane on a virtual desktop displayed on a desktop or laptop computer).

The user interface can incorporate various graphical control elements that the user can select in order to invoke functionality of the application program that generates the interface screens. For example, if user interface screen 1011 is presented on a touchscreen display, the user can touch a control element to select it. As another example, if the user interface is presented on a display that is not a touchscreen, the user can operate a pointing device (e.g., mouse, trackpad, etc.) to position a cursor over a control element, then select the control element by tapping or clicking.

User interface screen 1011 can be a starting screen displayed when the user first launches an application program to control the home automation system. In the examples herein, the automated environment is assumed to be a home, but it is to be understood that other automated environments can be configured and controlled using similar interfaces. User interface screen 1011 can provide a set of menus 1013 with graphical control elements that, when selected, cause the application program to display information in accordance with the selected menu. For example, selecting "HOME" may cause user interface screen 1011 to display a home screen, selecting "WINDOW" may cause user interface screen 1011 to display a representation 1015 of a photovoltaic window (e.g., a graphical representation), selecting "3D FLOORPLAN" may cause user interface screen 1011 to display the three-dimensional (3D) floor plan of the home, and the like.

In some embodiments, selecting "WINDOW" may cause user interface screen 1011 to display an information panel 1017 that may include information regarding the photovoltaic window contained the data signal. For example, information panel 1017 may include sensor data captured by the sensors of the photovoltaic window including an outside temperature, an inside temperature, an amount of detected light, and the like. Information panel 1017 may also include power data such as an amount of electrical power stored in the photovoltaic window, an amount of electrical power currently being generated by the photovoltaic window, and the like. Information panel 1017 may further include a video stream 1019 shown in real time as captured by an exterior-facing camera of the selected photovoltaic window.

In various embodiments, user interface screen 1011 may provide buttons and other graphical control elements through which a user may interact with the home automation system. For example, in some embodiments the app can receive user input to configure the model of the home automation system, e.g., by assigning photovoltaic windows having certain window functions to certain rooms or locations within the home, by assigning home functions to certain rooms or locations within the home, by defining window actions, home actions, or mappings between sensor data, power data, window actions, and home actions, and the like.

In some embodiments, user interface screen 1011 can provide a set of home monitoring and control features 1021. These features can be selected to modify what information is displayed on user interface screen 1011 and what interactable graphical elements may be provided. In the illustrated example, home monitoring and control features 1021 include "Window Status", "Temperature", "Lights", "Perimeter Check", "HVAC", and "Media". In some instances, selecting one of home monitoring and control features 1021 may cause various graphical elements to be overlaid onto the 3D floor plan of the home, as will be shown in reference to FIGS. 11A-11H.

Figures 11A, 11B:
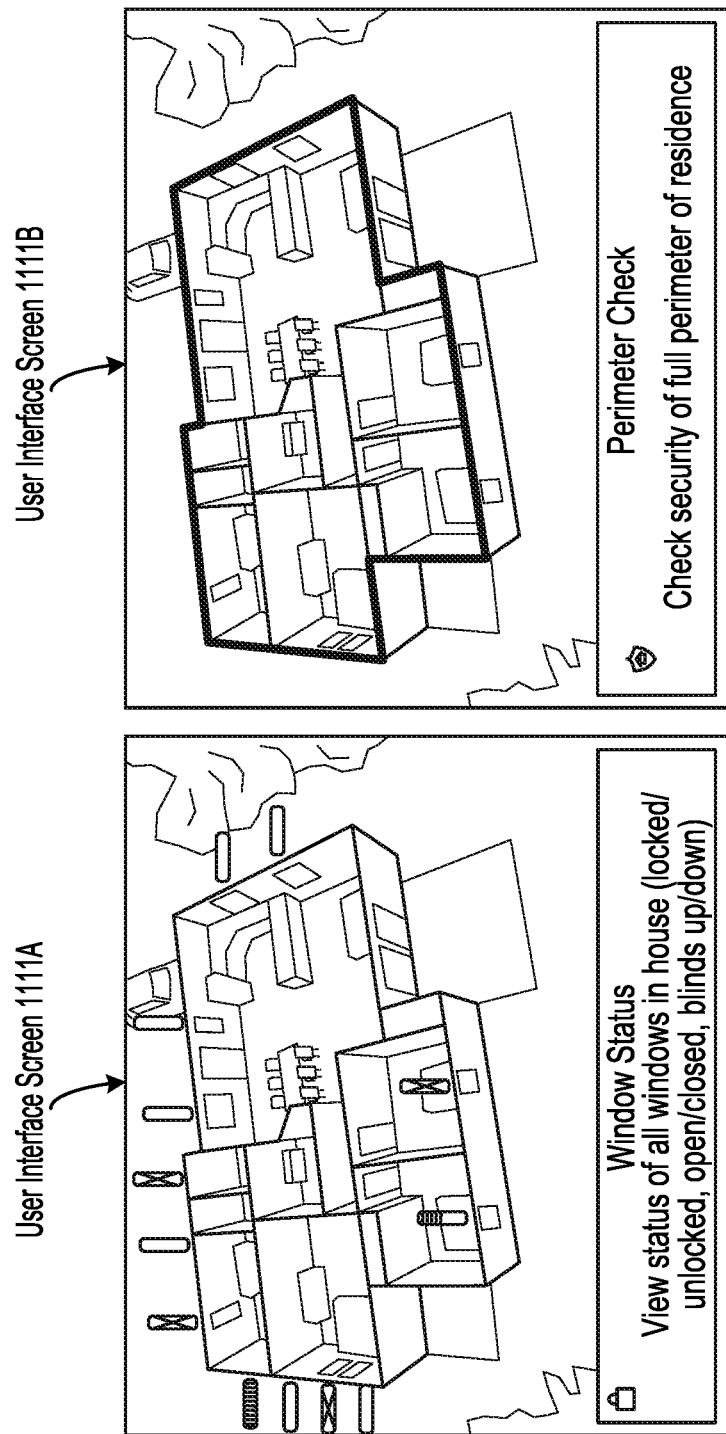
FIG. 11A illustrates an example of a user interface screen.
FIG. 11B illustrates an example of a user interface screen.

FIG. 11A illustrates an example of a user interface screen 1111A, according to some embodiments. In the illustrated example, graphical elements are overlaid onto the 3D floor plan of the home that show the status of each photovoltaic window, i.e., whether the window is opened or closed, locked or unlocked, or whether the blinds are up or down, etc. In some instances, a user may select a particular photovoltaic window on user interface screen 1111A to control a window function to perform a particular window action, i.e., causing an opened window to close, causing an unlocked window to lock, etc.

FIG. 11B illustrates an example of a user interface screen 1111B, according to some embodiments. In the illustrated example, graphical elements are overlaid onto the 3D floor plan of the home that show the status of the home's perimeter. In some instances, a solid line can be overlaid onto the outer walls of the home to show that all doors and windows are closed and locked.

Figures 11C, 11D:
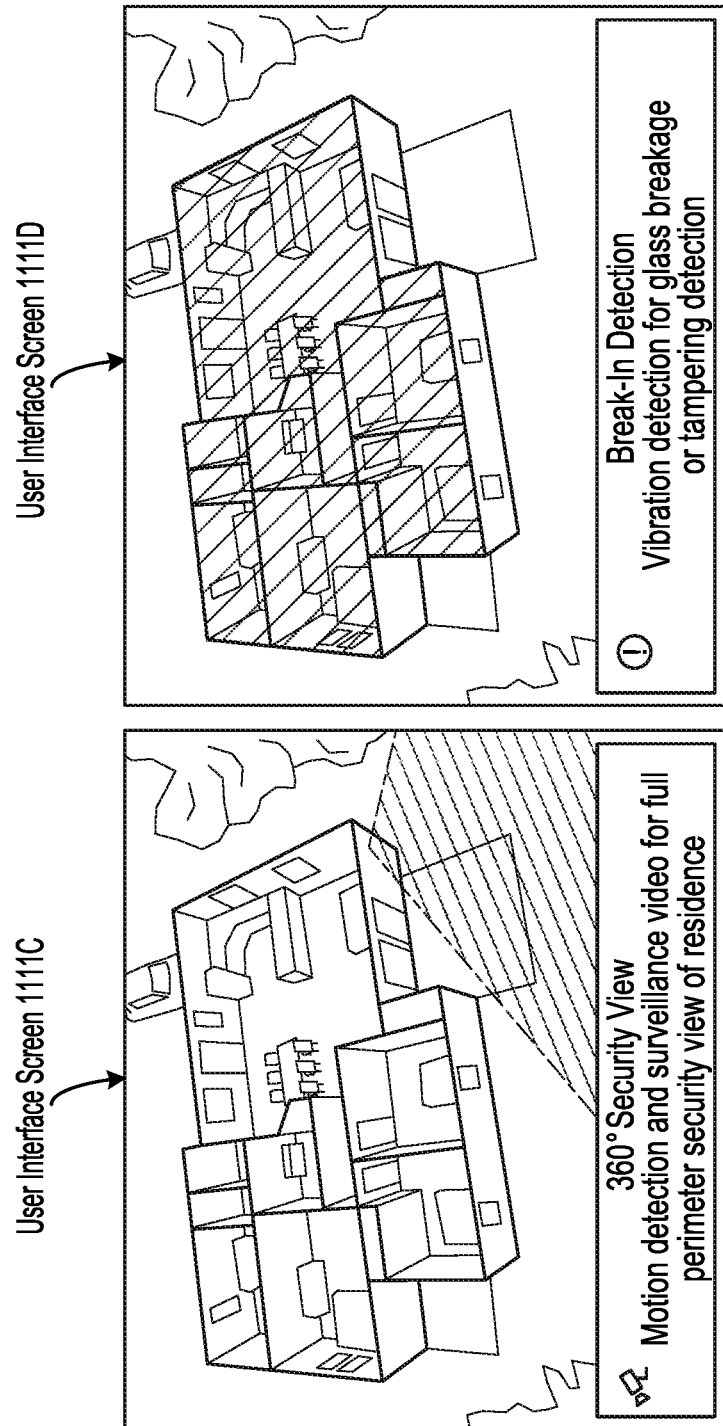
FIG. 11C illustrates an example of a user interface screen.
FIG. 11D illustrates an example of a user interface screen.

FIG. 11C illustrates an example of a user interface screen 1111C, according to some embodiments. In the illustrated example, graphical elements are overlaid onto the 3D floor plan of the home that show a 360° security view. In some instances, objects detected by exterior-facing cameras (or optionally interior-facing cameras) on the photovoltaic windows can be indicated on user interface screen 1111C. Furthermore, in some embodiments, images and/or videos captured by the exterior-facing cameras of multiple windows may be stitched together to form a real-time 360° view of the exterior of the home (as a bird's eye or first-person perspective). Alternatively or additionally, in a similar manner, images and/or videos captured by the interior-facing cameras of multiple windows may be stitched together to form a real-time view of the interior of the home (as a bird's eye or first-person perspective). User interface screen 1111C may be configured to display one or both of these interior and exterior real-time views separately or simultaneously for security purposes or any other purpose.

FIG. 11D illustrates an example of a user interface screen 1111D, according to some embodiments. In the illustrated example, graphical elements are overlaid onto the 3D floor plan of the home that show any vibrations in the home as detected using vibrations sensors equipped at the photovoltaic windows. In some instances, such detected vibrations can serve as a break-in detection system.

Figures 11E, 11F:
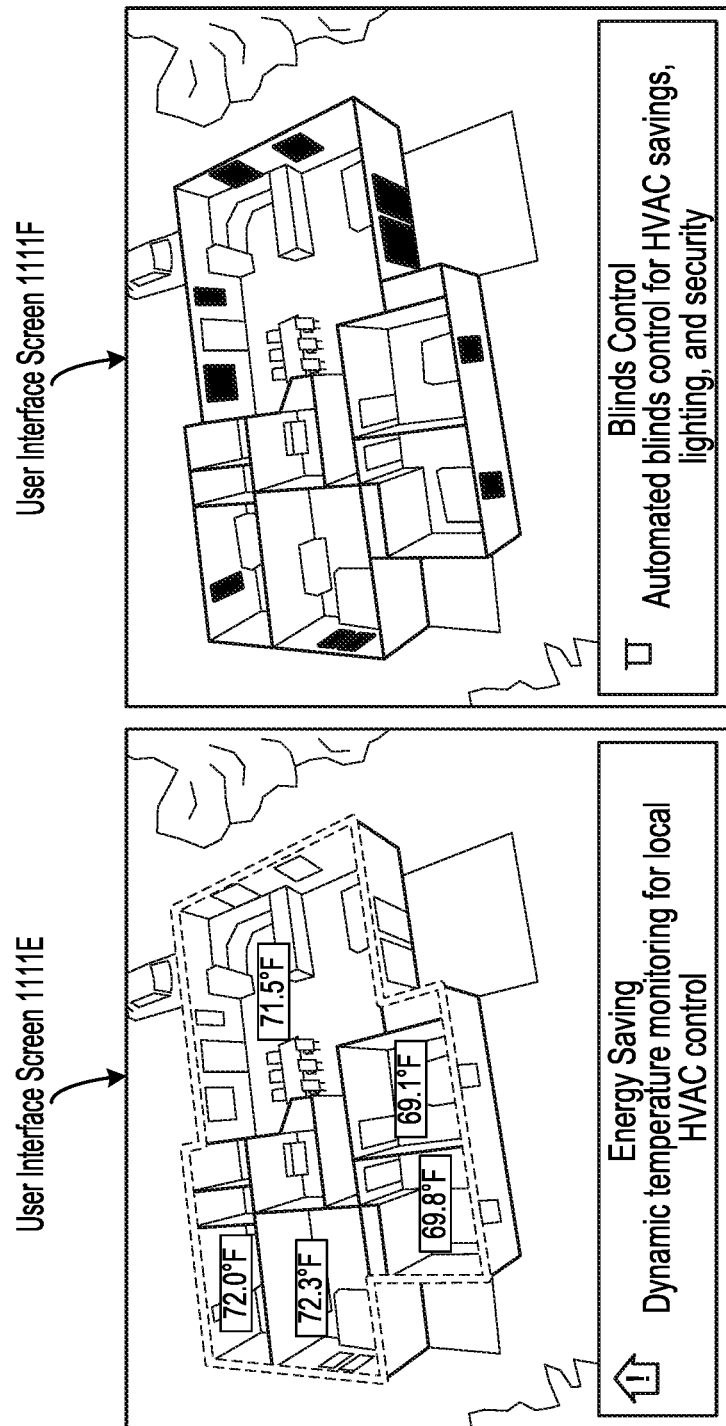
FIG. 11E illustrates an example of a user interface screen.
FIG. 11F illustrates an example of a user interface screen.

FIG. 11E illustrates an example of a user interface screen 1111E, according to some embodiments. In the illustrated example, graphical elements are overlaid onto the 3D floor plan of the home that show dynamic temperature monitoring for local HVAC control. In some instances, temperatures detected by interior temperature sensors on the photovoltaic windows can be displayed in corresponding rooms. In some instances, the user may select a displayed temperature to open up a window through which a new room temperature may be entered. In response, the home automation system may control one or more window functions or home functions to modify the local temperature toward the entered room temperature.

FIG. 11F illustrates an example of a user interface screen 1111F, according to some embodiments. In the illustrated example, graphical elements are overlaid onto the 3D floor plan of the home that show automated blinds control. In some instances, a user may select certain photovoltaic windows to allow (or disallow) access to control the window's blinds by other home monitoring and control features. In some instances, a user may select certain photovoltaic windows to toggle the status of the window's blinds to cause the blinds to open or close.

Figures 11G, 11H:
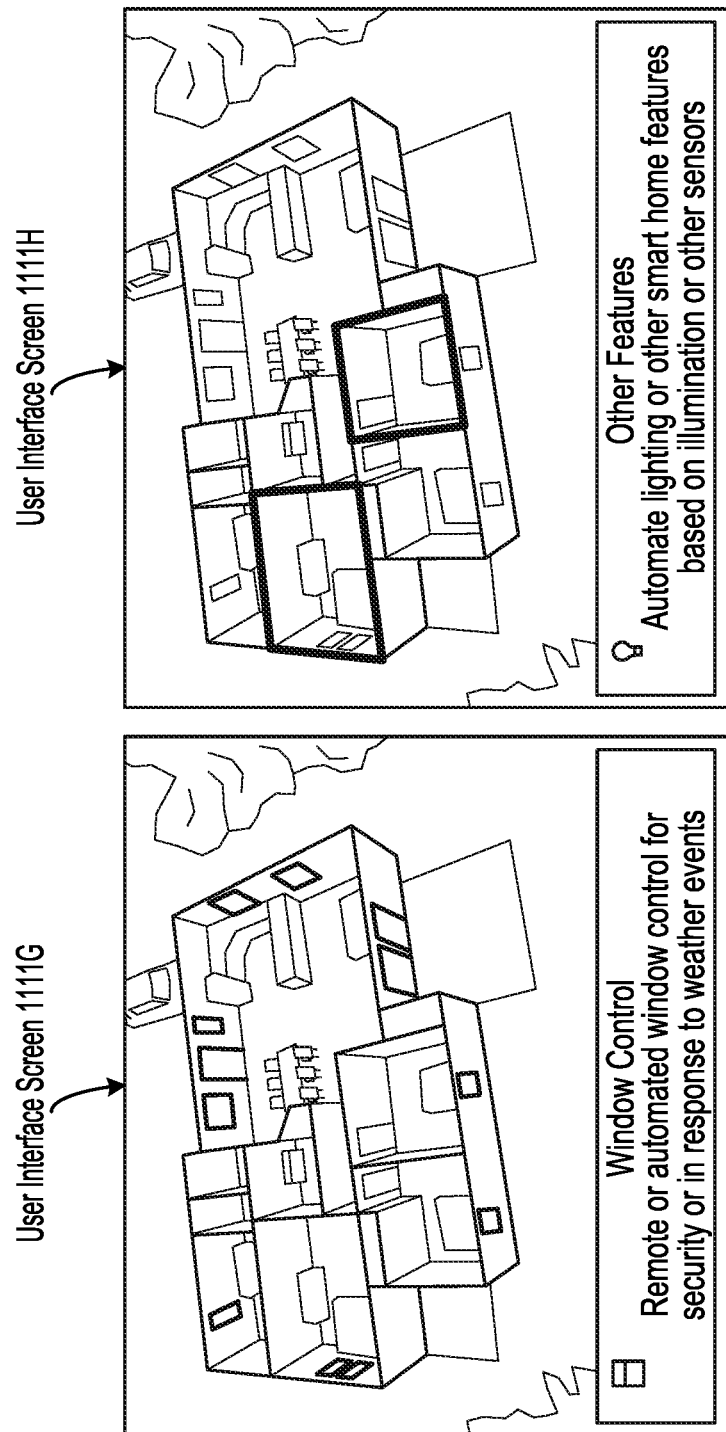
FIG. 11G illustrates an example of a user interface screen.
FIG. 11H illustrates an example of a user interface screen.

FIG. 11G illustrates an example of a user interface screen 1111G, according to some embodiments. In the illustrated example, graphical elements are overlaid onto the 3D floor plan of the home that show automated window control. In some instances, a user may select certain photovoltaic windows to allow (or disallow) access to control the window's opening/closing mechanism by other home monitoring and control features. In some instances, a user may select certain photovoltaic windows to toggle the status of the window to cause the window to open or close.

FIG. 11I illustrates an example of a user interface screen 1111H, according to some embodiments. In the illustrated example, graphical elements are overlaid onto the 3D floor plan of the home that show automated lighting or other smart home features based on illumination. In some instances, a user may view which lighting devices (window functions or home functions) are currently turned on and/or which room contain such devices. In some instances, a user may select certain lighting or other devices to change their status (e.g., a user may turn off interior or exterior lighting).

Figure 12A:
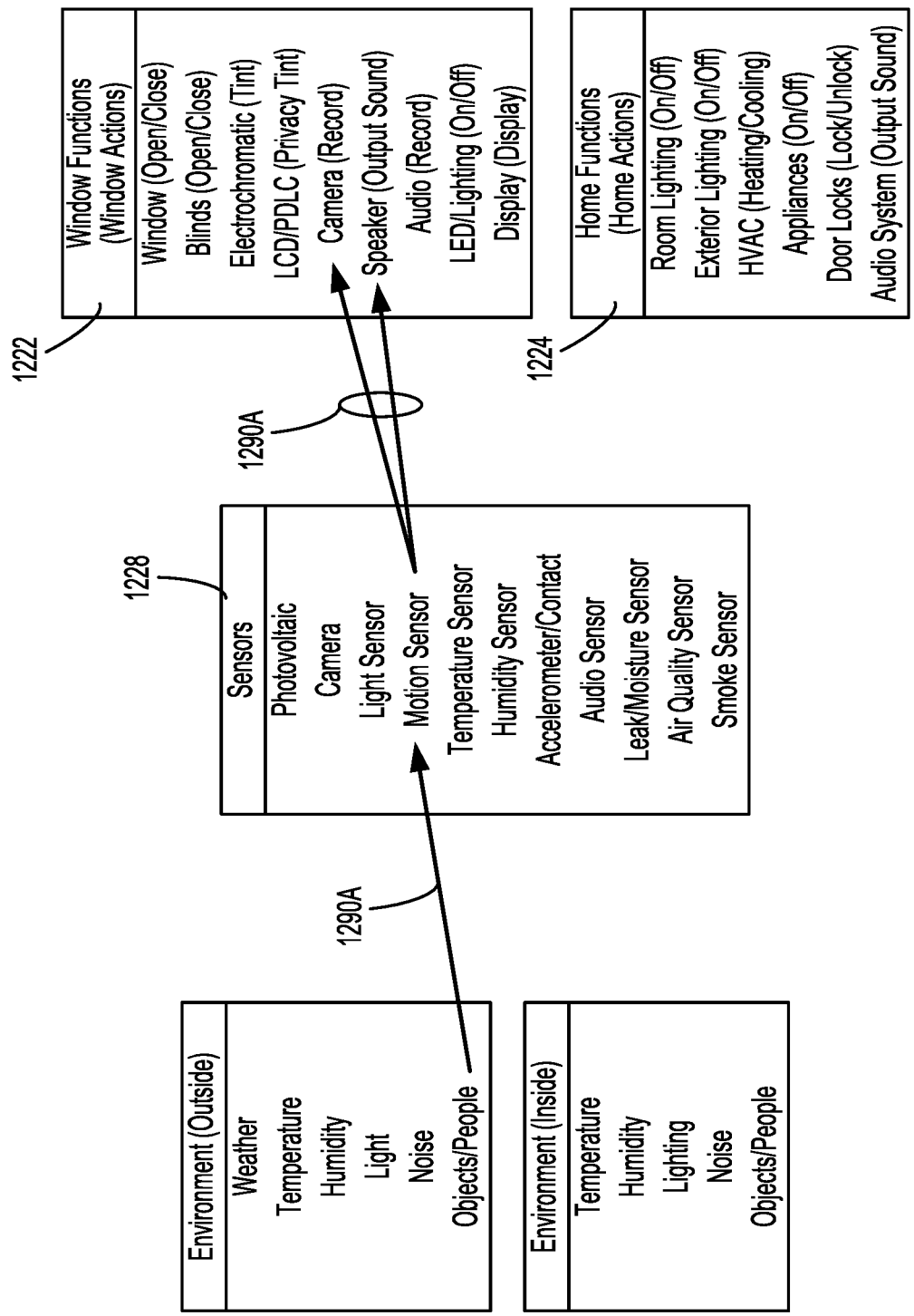
FIG. 12A illustrates an example mapping that may be implemented within a home automation system.

FIG. 12A illustrates an example mapping 1290A that may be implemented within a home automation system, according to some embodiments. In some instances, mappings 1290 may relate sensor data captured by sensors 1228 of the photovoltaic windows to certain window actions performed by window functions 1222 of the photovoltaic windows and/or certain home actions performed by home functions 1224. In the illustrated example, in response to motion sensors at the photovoltaic windows detecting objects outside of the home, video can be recorded and audio can be triggered to scare potential intruders away (e.g. dog barking), thereby implementing a security system within the home automation system.

Figure 12B:
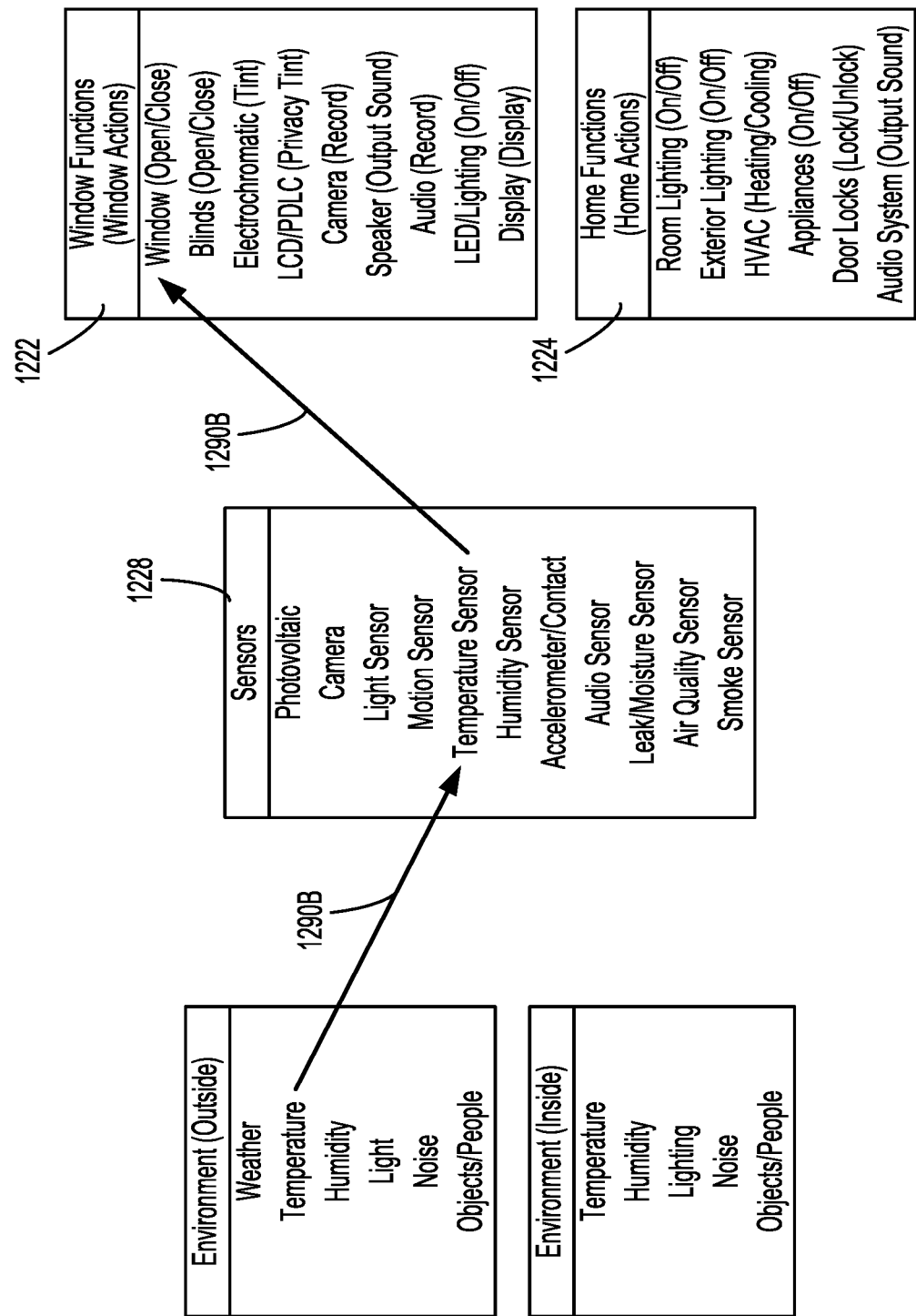
FIG. 12B illustrates an example mapping that may be implemented within a home automation system.

FIG. 12B illustrates an example mapping 1290B that may be implemented within a home automation system, according to some embodiments. In the illustrated example, in response to exterior temperature sensors at the photovoltaic windows detecting that the outside temperature is below a predetermined threshold, the windows may be closed to prevent the inside temperature from dropping. As such, opening and/or closing of the windows can be caused for ventilation based on temperature/weather.

Figure 12C:
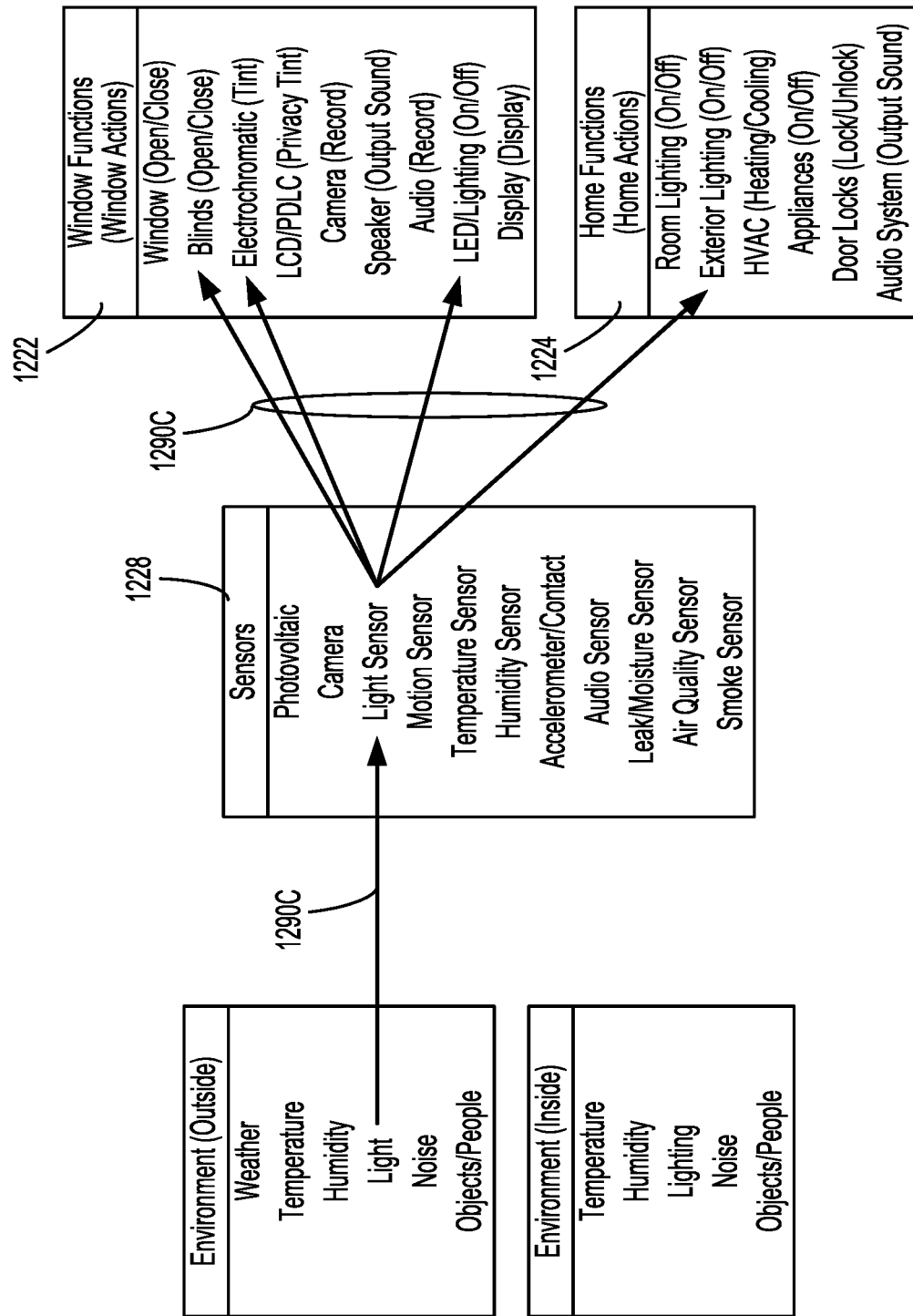
FIG. 12C illustrates an example mapping that may be implemented within a home automation system.

FIG. 12C illustrates an example mapping 1290C that may be implemented within a home automation system, according to some embodiments. In the illustrated example, in response to exterior light sensors at the photovoltaic windows detecting that the exterior light is above a predetermined threshold, the window blinds may be opened, the lighting at the window may be turned off, and/or the exterior lighting may be turned off. Alternatively or additionally, the tint state of the window may be modified using electrochromic control. As such, lighting and window tint can be controlled based on external illumination.

Figure 12D:
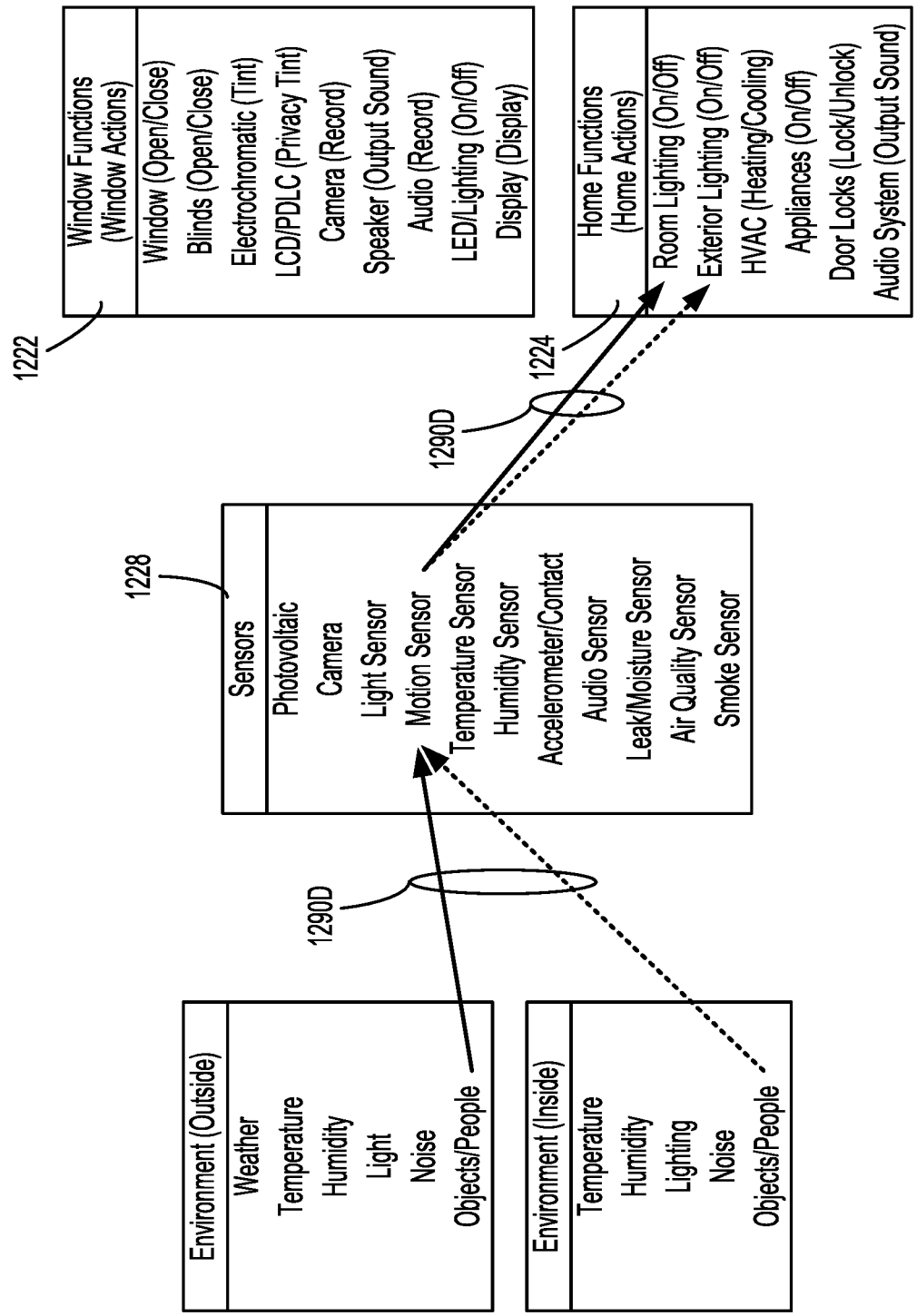
FIG. 12D illustrates an example mapping that may be implemented within a home automation system.

FIG. 12D illustrates an example mapping 1290D that may be implemented within a home automation system, according to some embodiments. In the illustrated example, in response to exterior motion sensors at the photovoltaic windows detecting an exterior object (or interior motion sensors at the photovoltaic windows detecting an interior object), the interior or exterior lighting may be modified to illuminate the detected object. As such, lighting can map the movement of individuals around and inside of a home or building.

Figure 12E:
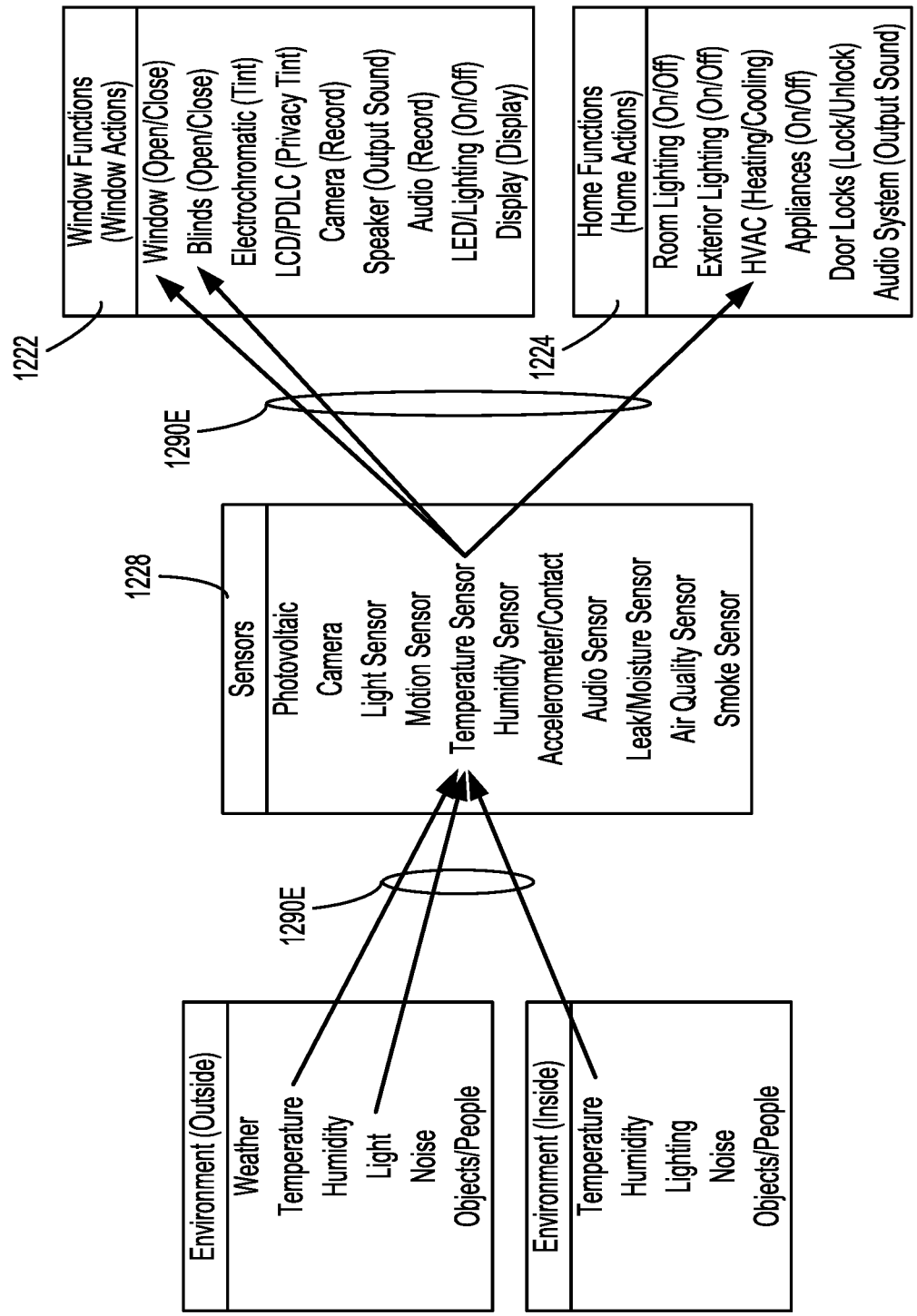
FIG. 12E illustrates an example mapping that may be implemented within a home automation system.

FIG. 12E illustrates an example mapping 1290E that may be implemented within a home automation system, according to some embodiments. In the illustrated example, in response to exterior temperature sensors at the photovoltaic windows detecting certain combinations of temperature and humidity and interior temperature sensor at the photovoltaic windows detecting certain interior temperatures, the windows, blinds, and HVAC may be modified in a particular manner to conserve energy using a localized model.

Figure 12F:
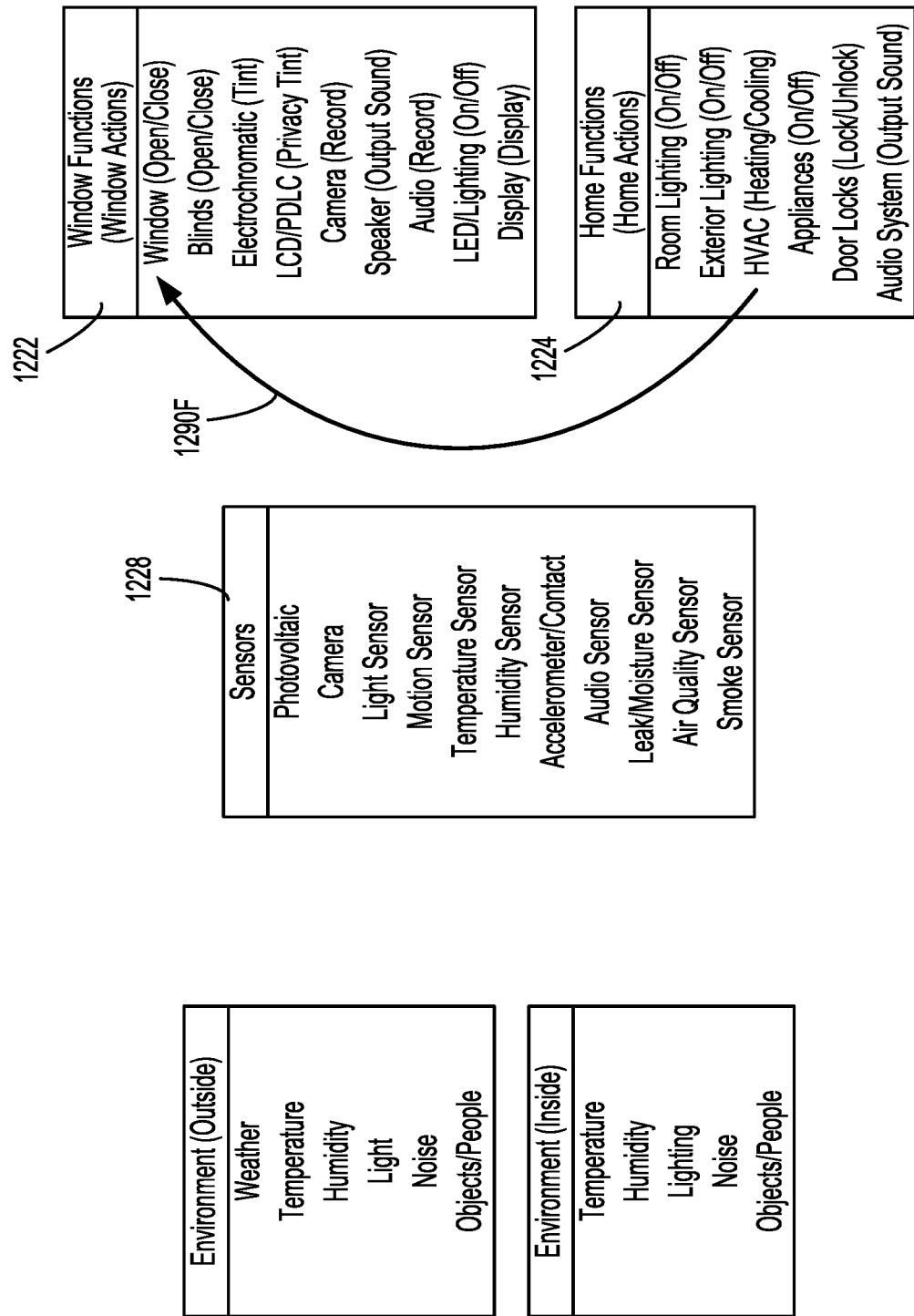
FIG. 12F illustrates an example mapping that may be implemented within a home automation system.

FIG. 12F illustrates an example mapping 1290F that may be implemented within a home automation system, according to some embodiments. In the illustrated example, in response to the home's heating or cooling system being activated, the photovoltaic windows may be closed to preserve energy.

Many variations and modifications to the examples described in FIGS. 12A-12F exist and are considered to be within the scope of the present disclosure. For example, any cause and effect mapping between the illustrated tables are possible, including, for example, any mapping from the Environment (Outside) table and/or the Environment (Inside) table to the Sensors table, any mapping from the Sensors table to the Window Functions/Actions table and/or the Home Functions/Actions table, or any mapping from the Home Functions/Actions table to the Window Functions/Actions table, among other possibilities.

Figure 13:
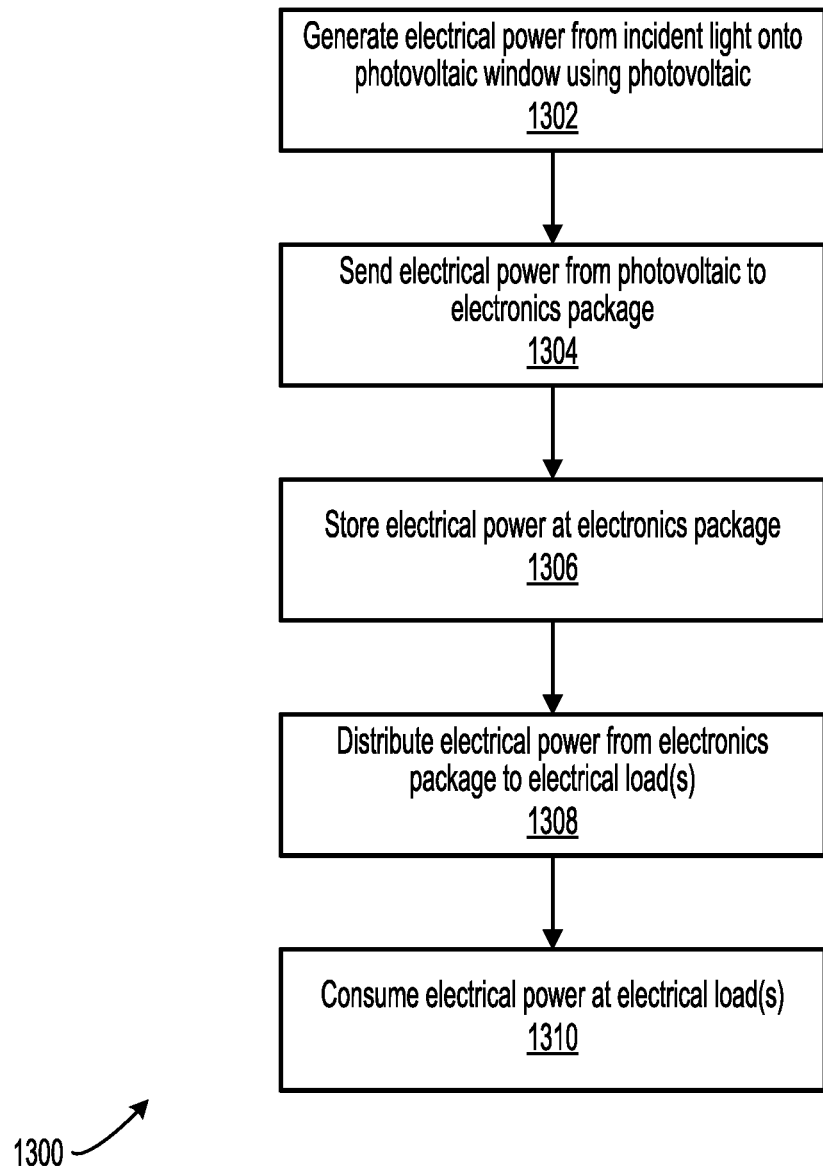
FIG. 13 illustrates a method of operating a photovoltaic window.

FIG. 13 illustrates a method 1300 of operating a photovoltaic window, according to some embodiments. One or more steps of method 1300 may be omitted during performance of method 1300, and steps of method 1300 may be performed in any order and/or in parallel. One or more steps of method 1300 may be performed by one or more processors. Method 1300 may be implemented as a computer-readable medium or computer program product comprising instructions which, when the program is executed by one or more computers, cause the one or more computers to carry out the steps of method 1300.

At step 1302, electrical power is generated using a photovoltaic (e.g., photovoltaics 108, 208, 808, 908) of a photovoltaic window (e.g., photovoltaic windows 102, 202, 302, 402, 502, 802, 902). The electrical power may be generated from incident light onto the photovoltaic window. The photovoltaic may be disposed in parallel with an interior glass (e.g., interior glass 584, 784, 884, 984) or an exterior glass (e.g., exterior glass 586, 786, 886, 986) of a glass unit (e.g., IGUs 352, 452, 552, 752, 852, 952) of the photovoltaic window.

At step 1304, the electrical power is sent from the photovoltaic to an electronics package (e.g., electronics packages 240, 440, 540, 640, 840, 940) of the photovoltaic window. The electronics package may be coupled with the glass unit. For example, the electronics package may be coupled directly with the glass unit or coupled indirectly with the glass unit via one or more intermediate components.

At step 1306, the electrical power is stored at the electronics package. The electrical power may be stored at a power storage (e.g., power storages 212, 412, 612) of the electronics package.

At step 1308, the electrical power is distributed from the electronics package to at least one electrical load (e.g., electrical load 236) of the photovoltaic window. The at least one electrical load may include a wireless communication system (e.g., wireless communication systems 216, 416, 616), one or more sensors (e.g., sensors 128, 228, 328, 1228), one or more window functions (e.g., window functions 122, 222, 1222), and/or a power outlet (e.g., power outlets 226, 326, 426, 526, 626).

At step 1310, the electrical power is consumed by the at least one electrical load.

Figure 14:
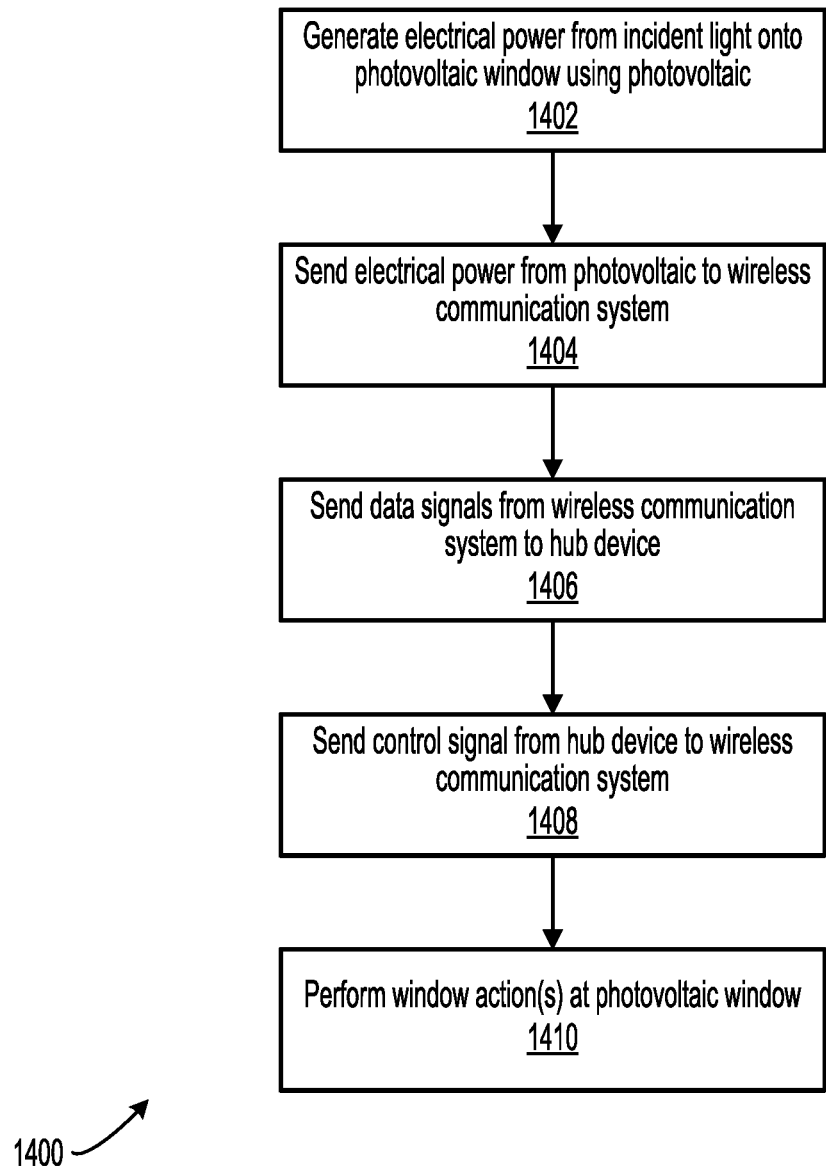
FIG. 14 illustrates a method of operating a home automation system.

FIG. 14 illustrates a method 1400 of operating a home automation system, according to some embodiments. One or more steps of method 1400 may be omitted during performance of method 1400, and steps of method 1400 may be performed in any order and/or in parallel. One or more steps of method 1400 may be performed by one or more processors. Method 1400 may be implemented as a computer-readable medium or computer program product comprising instructions which, when the program is executed by one or more computers, cause the one or more computers to carry out the steps of method 1400.

At step 1402, electrical power is generated using a photovoltaic (e.g., photovoltaics 108, 208, 808, 908) of a photovoltaic window (e.g., photovoltaic windows 102, 202, 302, 402, 502, 802, 902). The photovoltaic window may be one of one or more photovoltaic windows of a home automation system (e.g., home automation systems 100, 200). The electrical power may be generated from incident light onto the photovoltaic window.

At step 1404, the electrical power is sent from the photovoltaic to a wireless communication system (e.g., wireless communication systems 216, 416, 616) of the photovoltaic window. Receiving the electrical power may enable wireless communication between the wireless communication system and a hub device (e.g., hub devices 134, 234) of the home automation system. The wireless communication system may be solely powered by the electrical power generated by the photovoltaic.

At step 1406, a data signal (e.g., data signal 292) is sent from the wireless communication system to the hub device. The data signal may include information regarding the photovoltaic window. The data signal may include sensor data and/or power data.

At step 1408, a control signal (e.g., control signal 294) is sent from the hub device to the wireless communication system.

At step 1410, one or more window actions are performed by one or more window functions (e.g., window functions 122, 222, 1222) at the photovoltaic window in accordance with the control signal.

Figure 15:
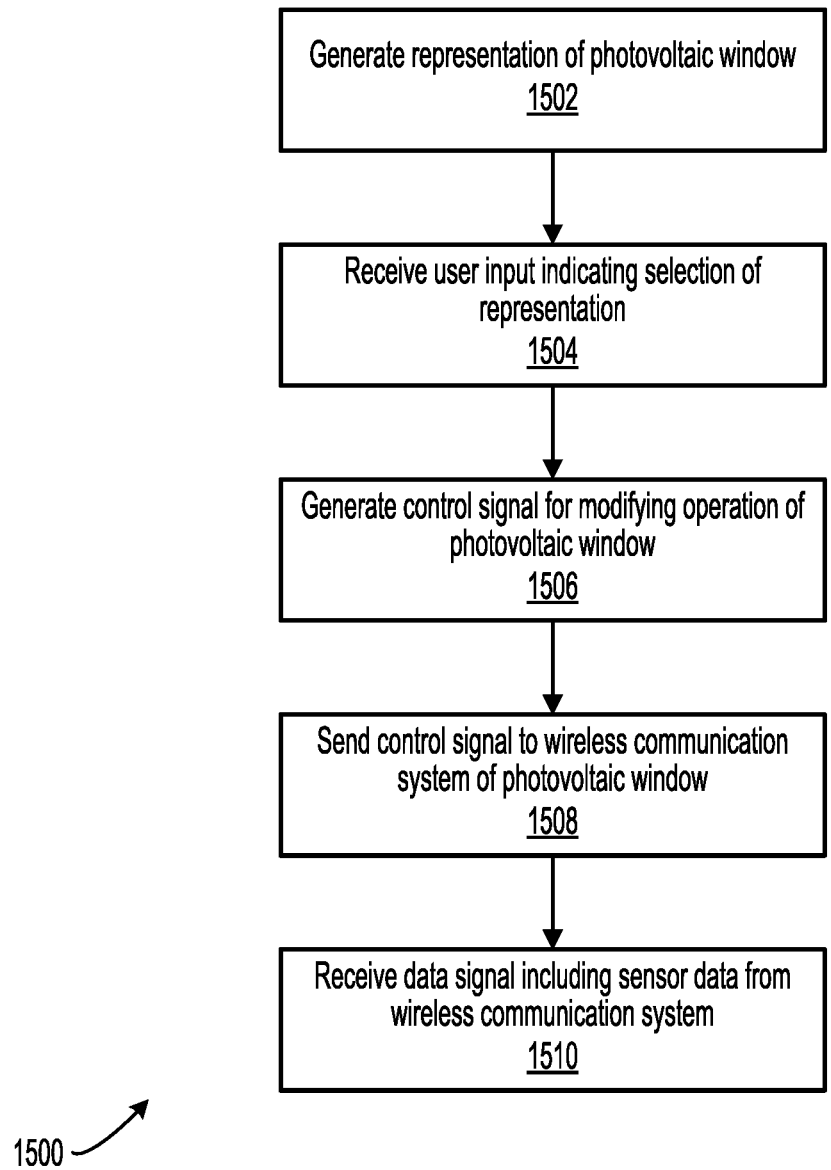
FIG. 15 illustrates a method of controlling a photovoltaic window from a user device.

FIG. 15 illustrates a method 1500 of controlling a photovoltaic window from a user device, according to some embodiments. One or more steps of method 1500 may be omitted during performance of method 1500, and steps of method 1500 may be performed in any order and/or in parallel. One or more steps of method 1500 may be performed by one or more processors. Method 1500 may be implemented as a computer-readable medium or computer program product comprising instructions which, when the program is executed by one or more computers, cause the one or more computers to carry out the steps of method 1500.

At step 1502, a representation (e.g., representation 1015) of a photovoltaic window (e.g., photovoltaic windows 102, 202, 302, 402, 502, 802, 902) is generated. The representation may be a graphical representation. The representation may be generated at a user device (e.g., user devices 120, 220, 1920). The representation of may generated by an application program running (or executing) on the user device.

At step 1504, a user input is received via a user interface (e.g., user interface 1929) of the user device. The user input may indicate a selection of the representation of the photovoltaic window. The user input may correspond to a user (e.g., user 104) interacting with a graphical element on the user interface and/or a display (e.g., display 1937) of the user device causing the representation of the photovoltaic window to be displayed, or causing the selection of the already-displayed representation of the photovoltaic window.

At step 1506, a control signal (e.g., control signal 294) for modifying an operation of the photovoltaic window is generated. The control signal may be generated in response to receiving the user input. The control signal may be generated at the user device.

At step 1508, the control signal is sent to a wireless communication system (e.g., wireless communication systems 216, 416, 616) of the photovoltaic window. The control signal may be sent by the user device. The control signal may be sent using a communication interface (e.g., communication interface 1935) of the user device. The wireless communication system may be powered solely by electrical power generated by a photovoltaic (e.g., photovoltaics 108, 208, 808, 908) of the photovoltaic window. The electrical power may be generated from incident light onto the photovoltaic window.

At step 1510, a data signal (e.g., data signal 292) is received. The data signal may include information regarding the photovoltaic window. The data signal may be generated by the photovoltaic window in response to receiving the control signal. The data signal may be received by the user device. The user device may display the information regarding the photovoltaic window on the display.

Figures 16, 17:
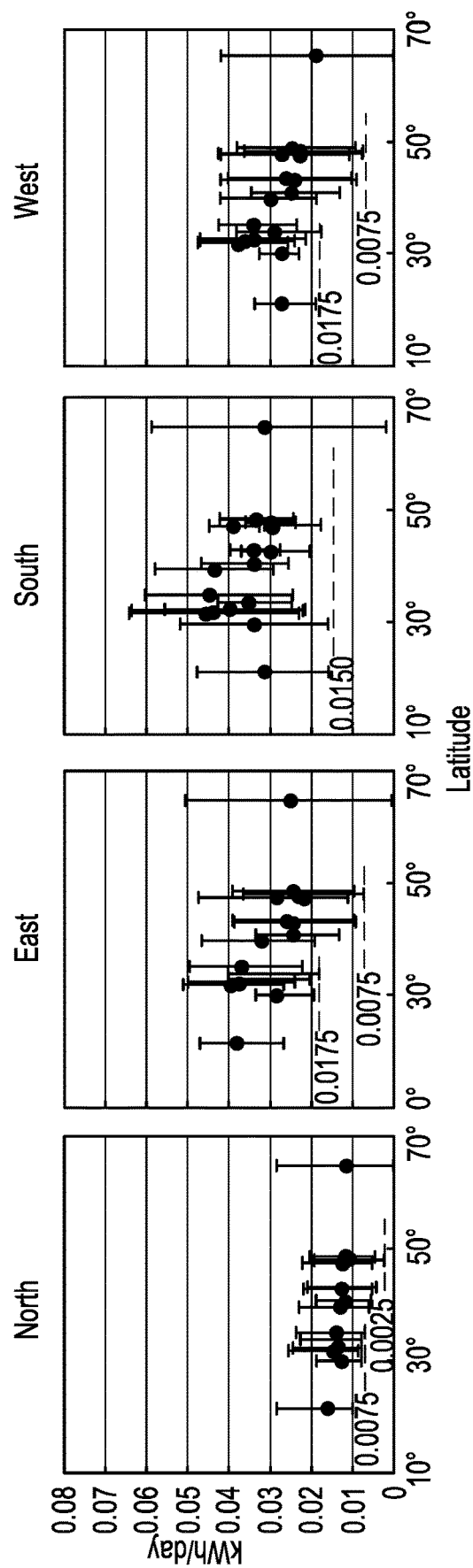
FIG. 16 illustrates various plots showing daily photovoltaic energy generation.
FIG. 17 illustrates a table showing daily photovoltaic energy generation.

FIG. 16 illustrates various plots showing daily photovoltaic energy generation, according to some embodiments. The illustrated data corresponds to the daily energy generated from a 3 feet by 5 feet photovoltaic window at 1% efficiency facing four different directions: North, East, South, and West. Different data points correspond to different regions of the United States. It can be observed that the daily energy generated is lowest when the photovoltaic window is facing North, and that some of the highest amounts of energy are generated when the photovoltaic window is facing South. The lower bounds for the data are also shown in each of the four plots.

FIG. 17 illustrates a table showing daily photovoltaic energy generation, according to some embodiments. The data in the illustrated table is calculated based on the data shown in the plots in FIG. 16. For example, the table shows that the lower bound daily energy consumptions for all four directions is 0.0025 kWh/day (and 0.0075 kWh/day when only considering climate zones 1-3), for East/South/West is 0.0075 kWh/day (and 0.0175 kWh/day when only considering climate zones 1-3), and for South only is 0.0150 kWh/day.

Figure 18:
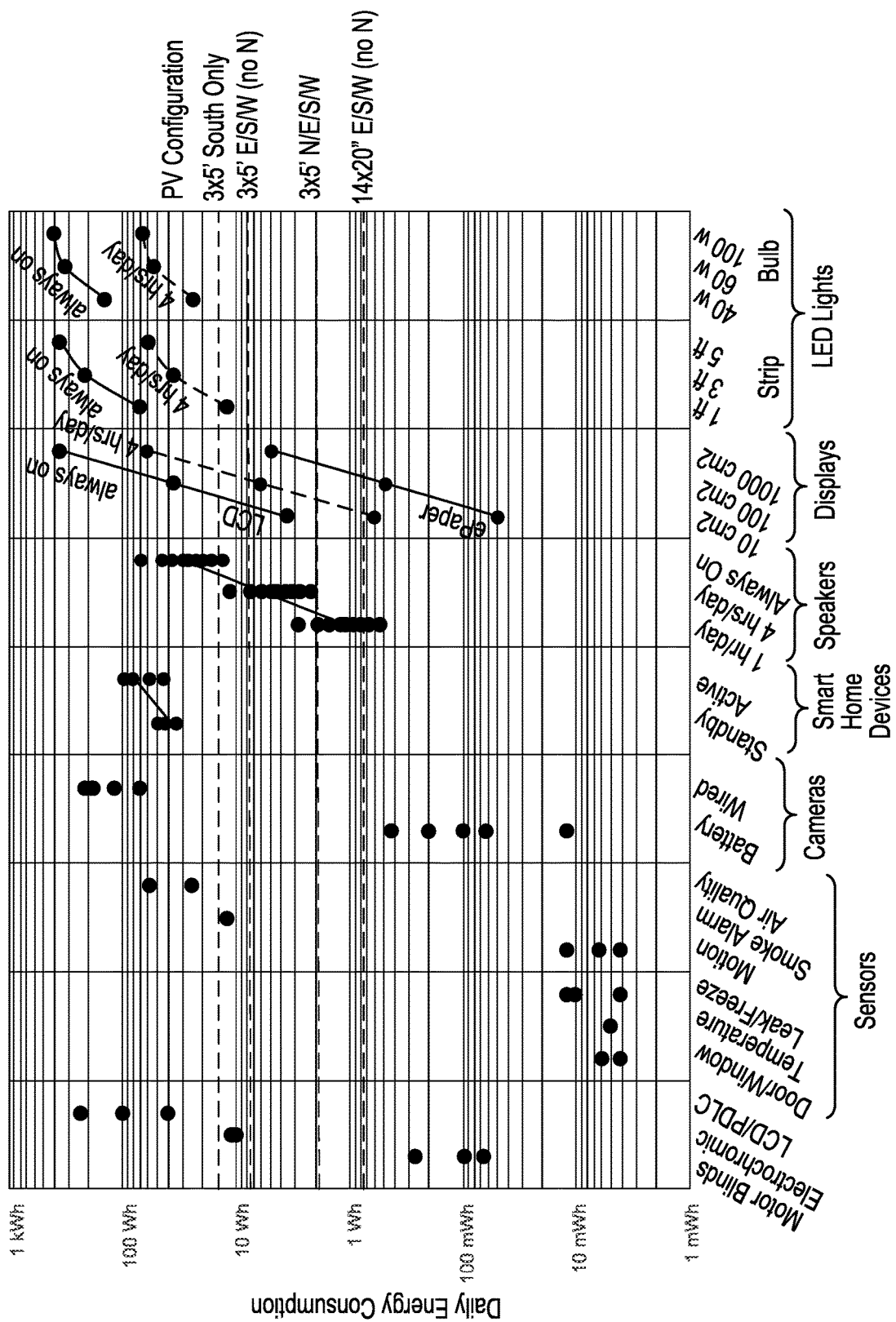
FIG. 18 illustrates a plot showing the daily energy consumption for various devices.

FIG. 18 illustrates a plot showing the daily energy consumption for various devices, according to some embodiments. The devices include sensors, cameras, smart home devices, speakers, displays, lights, and other window functions such as motorized blinds and electrochromic devices. Also shown in FIG. 18 are the lower bound daily energy consumptions from FIGS. 16 and 17. It can be observed that the photovoltaic windows can power many different electrical components and devices as currently configured. It should be noted that more and more devices will become compatible with the photovoltaic windows as the energy efficiencies increase for both the devices as well as the photovoltaic windows.

Figure 19:
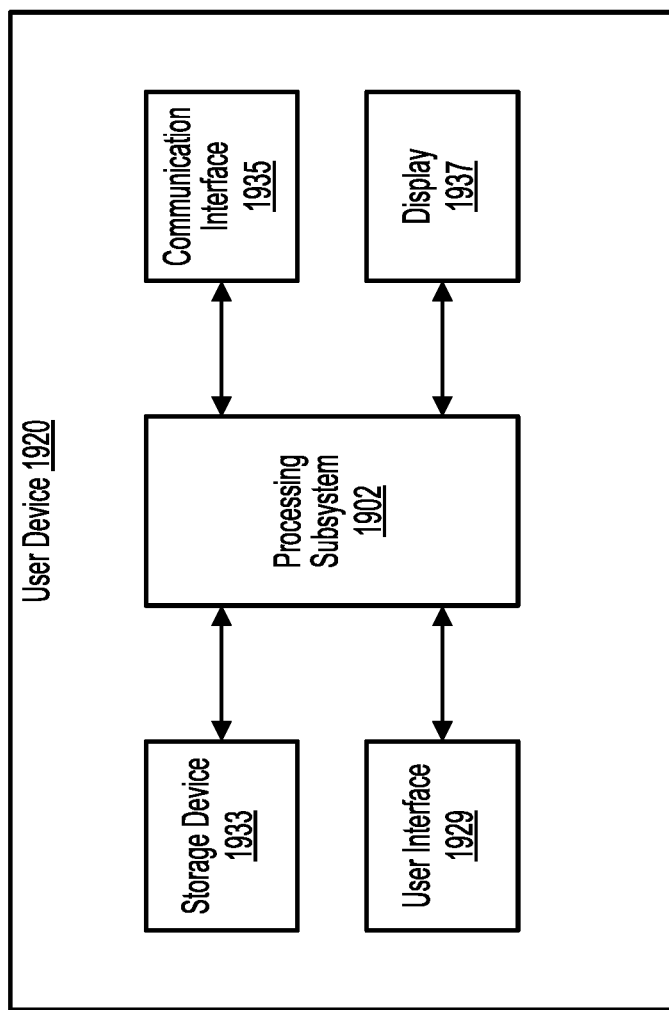
FIG. 19 illustrates s a simplified block diagram of a user device.

FIG. 19 illustrates s a simplified block diagram of a user device 1920, according to some embodiments. User device 1920 can implement any or all of the functions, behaviors, and capabilities described herein, as well as other functions, behaviors, and capabilities not expressly described. User device 1920 can include processing subsystem 1902, storage device 1933, user interface 1929, communication interface 1935, and display 1937. User device 1920 can also include other components (not explicitly shown) such as a battery, power controllers, and other components operable to provide various enhanced capabilities. In various embodiments, user device 1920 can be implemented in a desktop computer, laptop computer, tablet computer, smart phone, other mobile phone, wearable computing device, or other systems having any desired form factor. Further, user device 1920 can be implemented partly in a base station and partly in a mobile unit that communicates with the base station and provides a user interface.

Storage device 1933 can be implemented, e.g., using disk, flash memory, or any other non-transitory storage medium, or a combination of media, and can include volatile and/or non-volatile media. In some embodiments, storage device 1933 can store one or more application and/or operating system programs to be executed by processing subsystem 1902, including programs to implement various operations described above. For example, storage device 1933 can store an application program for presenting the user interface screens described in FIGS. 10-11H on display 1937 and/or user interface 1929.

User interface 1929 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital to analog or analog to digital converters, signal processors, or the like). A user can operate input devices of user interface 1929 to invoke the functionality of user device 1920 and can view and/or hear output from user device 1920 via output devices of user interface 1929 (and/or via display 1937, which may be integrated with user interface 1929).

Processing subsystem 1902 can be implemented as one or more integrated circuits, e.g., one or more single core or multi core microprocessors or microcontrollers, examples of which are known in the art. In operation, processing subsystem 1902 can control the operation of user device 1920. In various embodiments, processing subsystem 1902 can execute a variety of programs in response to program code and can maintain multiple concurrently executing programs or processes. At any given time, some or all of the program code to be executed can be resident in processing subsystem 1902 and/or in storage media such as storage device 1933.

Through suitable programming, processing subsystem 1902 can provide various functionality for user device 1920. For example, in some embodiments, processing subsystem 1902 can implement various processes (or portions thereof) described above as being implemented by a user device. Processing subsystem 1902 can also execute other programs to control other functions of user device 1920, including application programs that may be stored in storage device 1933.

Communication interface 1935 can provide voice and/or data communication capability for user device 1920. In some embodiments communication interface 1935 can include radio frequency (RF) transceiver components for accessing wireless voice and/or data networks (e.g., using cellular telephone technology, data network technology such as 3G, 4G/LTE, WiFi, other IEEE 802.11 family standards, or other mobile communication technologies, or any combination thereof), components for short range wireless communication (e.g., using Bluetooth and/or Bluetooth LE standards, NFC, etc.), and/or other components. In some embodiments communication interface 1935 can provide wired network connectivity (e.g., Ethernet) in addition to or instead of a wireless interface.

Figure 20:
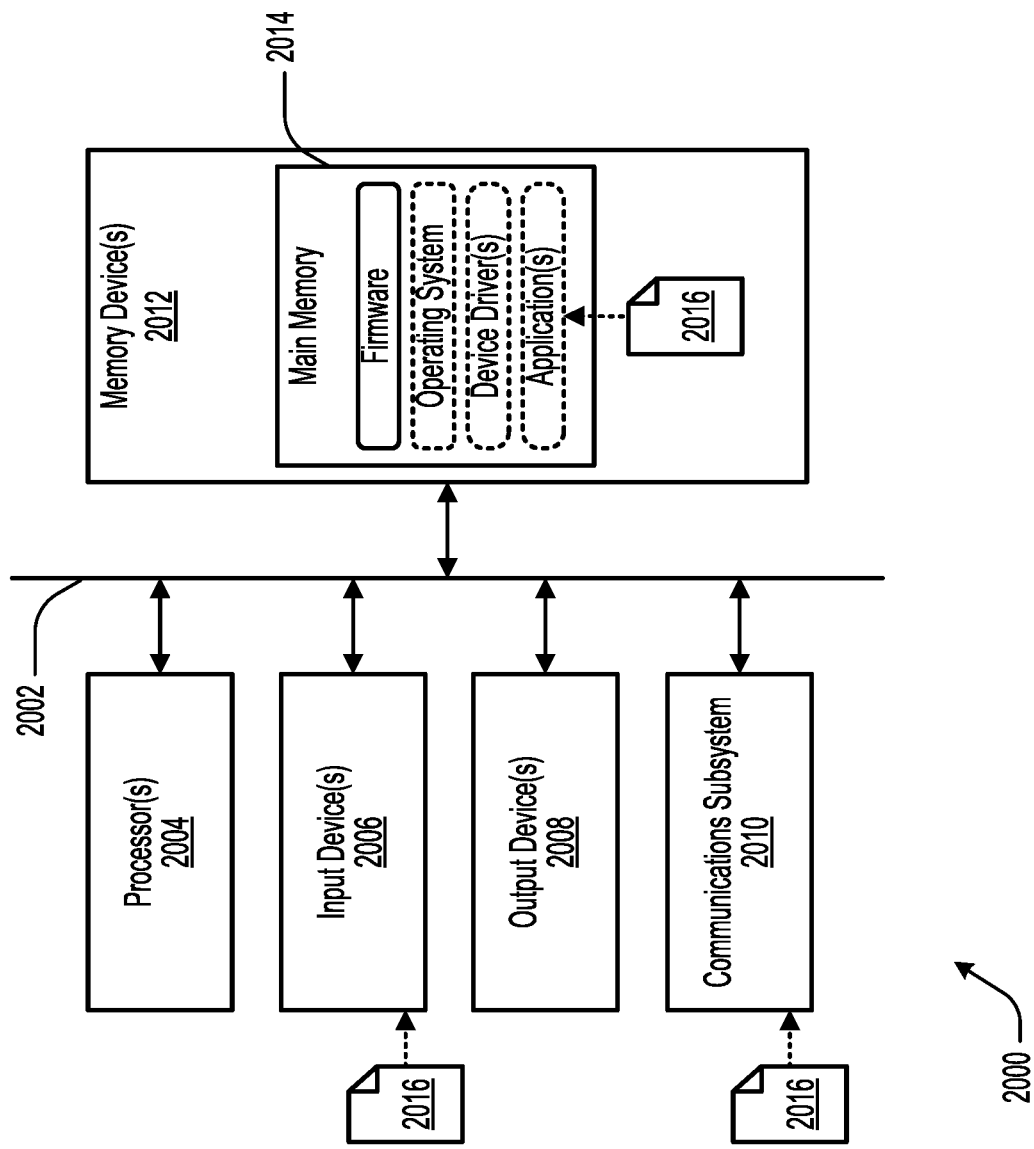
FIG. 20 illustrates an example computer system comprising various hardware elements.

FIG. 20 illustrates an example computer system 2000 comprising various hardware elements, according to some embodiments. Computer system 2000 may be incorporated into or integrated with devices described herein and/or may be configured to perform some or all of the steps of the methods provided by various embodiments. For example, in various embodiments, computer system 2000 may be incorporated into photovoltaic windows, hub devices, or user devices. It should be noted that FIG. 20 is meant only to provide a generalized illustration of various components, any or all of which may be utilized as appropriate. FIG. 20, therefore, broadly illustrates how individual system elements may be implemented in a relatively separated or relatively more integrated manner.

In the illustrated example, computer system 2000 includes a communication medium 2002, one or more processor(s) 2004, one or more input device(s) 2006, one or more output device(s) 2008, a communications subsystem 2010, and one or more memory device(s) 2012. Computer system 2000 may be implemented using various hardware implementations and embedded system technologies. For example, one or more elements of computer system 2000 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 2000 may be communicatively coupled via communication medium 2002. While communication medium 2002 is illustrated as a single connection for purposes of clarity, it should be understood that communication medium 2002 may include various numbers and types of communication media for transferring data between hardware elements. For example, communication medium 2002 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 2002 may include one or more buses connecting pins of the hardware elements of computer system 2000. For example, communication medium 2002 may include a bus that connects processor(s) 2004 with main memory 2014, referred to as a system bus, and a bus that connects main memory 2014 with input device(s) 2006 or output device(s) 2008, referred to as an expansion bus. The system bus may itself consist of several buses, including an address bus, a data bus, and a control bus. The address bus may carry a memory address from processor(s) 2004 to the address bus circuitry associated with main memory 2014 in order for the data bus to access and carry the data contained at the memory address back to processor(s) 2004. The control bus may carry commands from processor(s) 2004 and return status signals from main memory 2014. Each bus may include multiple wires for carrying multiple bits of information and each bus may support serial or parallel transmission of data.

Processor(s) 2004 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 2004 may include one or more multi-core processors, in which each core may read and execute program instructions concurrently with the other cores, increasing speed for programs that support multithreading.

Input device(s) 2006 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like.

Input device(s) 2006 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 2008 may include one or more of various devices that convert information into human-readable form, such as without limitation a display device, a speaker, a printer, a haptic or tactile device, and/or the like. Output device(s) 2008 may also include devices for writing to removable storage devices or other removable media, such as those described in reference to input device(s) 2006. Output device(s) 2008 may also include various actuators for causing physical movement of one or more components. Such actuators may be hydraulic, pneumatic, electric, and may be controlled using control signals generated by computer system 2000.

Communications subsystem 2010 may include hardware components for connecting computer system 2000 to systems or devices that are located external to computer system 2000, such as over a computer network. In various embodiments, communications subsystem 2010 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 2012 may include the various data storage devices of computer system 2000. For example, memory device(s) 2012 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 2004 and memory device(s) 2012 are illustrated as being separate elements, it should be understood that processor(s) 2004 may include varying levels of on-processor memory, such as processor registers and caches that may be utilized by a single processor or shared between multiple processors.

Memory device(s) 2012 may include main memory 2014, which may be directly accessible by processor(s) 2004 via the memory bus of communication medium 2002. For example, processor(s) 2004 may continuously read and execute instructions stored in main memory 2014. As such, various software elements may be loaded into main memory 2014 to be read and executed by processor(s) 2004 as illustrated in FIG. 20. Typically, main memory 2014 is volatile memory, which loses all data when power is turned off and accordingly needs power to preserve stored data. Main memory 2014 may further include a small portion of non-volatile memory containing software (e.g., firmware, such as BIOS) that is used for reading other software stored in memory device(s) 2012 into main memory 2014. In some embodiments, the volatile memory of main memory 2014 is implemented as RAM, such as dynamic random-access memory (DRAM), and the non-volatile memory of main memory 2014 is implemented as read-only memory (ROM), such as flash memory, erasable programmable read-only memory (EPROM), or electrically erasable programmable read-only memory (EEPROM).

Computer system 2000 may include software elements, shown as being currently located within main memory 2014, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 2016, which are executable by computer system 2000. In one example, such instructions 2016 may be received by computer system 2000 using communications subsystem 2010 (e.g., via a wireless or wired signal that carries instructions 2016), carried by communication medium 2002 to memory device(s) 2012, stored within memory device(s) 2012, read into main memory 2014, and executed by processor(s) 2004 to perform one or more steps of the described methods. In another example, instructions 2016 may be received by computer system 2000 using input device(s) 2006 (e.g., via a reader for removable media), carried by communication medium 2002 to memory device(s) 2012, stored within memory device(s) 2012, read into main memory 2014, and executed by processor(s) 2004 to perform one or more steps of the described methods.

In some embodiments of the present disclosure, instructions 2016 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 2000. For example, the non-transitory computer-readable medium may be one of memory device(s) 2012 (as shown in FIG. 20). In some cases, the non-transitory computer-readable medium may be separate from computer system 2000. In one example, the non-transitory computer-readable medium may be a removable medium provided to input device(s) 2006 (as shown in FIG. 20), such as those described in reference to input device(s) 2006, with instructions 2016 being read into computer system 2000 by input device(s) 2006. In another example, the non-transitory computer-readable medium may be a component of a remote electronic device, such as a mobile phone, that may wirelessly transmit a data signal that carries instructions 2016 to computer system 2000 and that is received by communications subsystem 2010 (as shown in FIG. 20).

Instructions 2016 may take any suitable form to be read and/or executed by computer system 2000. For example, instructions 2016 may be source code (written in a human-readable programming language such as Java, C, C++, C#, Python), object code, assembly language, machine code, microcode, executable code, and/or the like. In one example, instructions 2016 are provided to computer system 2000 in the form of source code, and a compiler is used to translate instructions 2016 from source code to machine code, which may then be read into main memory 2014 for execution by processor(s) 2004. As another example, instructions 2016 are provided to computer system 2000 in the form of an executable file with machine code that may immediately be read into main memory 2014 for execution by processor(s) 2004. In various examples, instructions 2016 may be provided to computer system 2000 in encrypted or unencrypted form, compressed or uncompressed form, as an installation package or an initialization for a broader software deployment, among other possibilities.

In one aspect of the present disclosure, a system (e.g., computer system 2000) is provided to perform methods in accordance with various embodiments of the present disclosure. For example, some embodiments may include a system comprising one or more processors (e.g., processor(s) 2004) that are communicatively coupled to a non-transitory computer-readable medium (e.g., memory device(s) 2012 or main memory 2014). The non-transitory computer-readable medium may have instructions (e.g., instructions 2016) stored therein that, when executed by the one or more processors, cause the one or more processors to perform the methods described in the various embodiments.

In another aspect of the present disclosure, a computer-program product that includes instructions (e.g., instructions 2016) is provided to perform methods in accordance with various embodiments of the present disclosure. The computer-program product may be tangibly embodied in a non-transitory computer-readable medium (e.g., memory device(s) 2012 or main memory 2014). The instructions may be configured to cause one or more processors (e.g., processor(s) 2004) to perform the methods described in the various embodiments.

In another aspect of the present disclosure, a non-transitory computer-readable medium (e.g., memory device(s) 2012 or main memory 2014) is provided. The non-transitory computer-readable medium may have instructions (e.g., instructions 2016) stored therein that, when executed by one or more processors (e.g., processor(s) 2004), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

The disclosures of the following patent applications are incorporated by reference in their entirety for all purposes: U.S. Patent Application Ser. No. 62/836,161, U.S. Patent Application Ser. No. 63/086,923, U.S. patent application Ser. No. 13/358,075 (which is U.S. Patent Application Publication No. 2012/0186623), U.S. patent application Ser. No. 13/495,379 (which is U.S. Patent Application Publication No. 2013/0333755), PCT Patent Publication No. WO 2020/056361, and PCT Patent Publication No. WO 2018/232358.

What is claimed is:

1. A home automation system comprising:
   a hub device; and
   one or more photovoltaic windows communicatively coupled to the hub device, wherein each photovoltaic window of the one or more photovoltaic windows includes:
   a photovoltaic configured to generate electrical power from incident light onto the photovoltaic window, wherein the photovoltaic is integrated with a glass of the photovoltaic window, and wherein the photovoltaic substantially covers a visible portion of the photovoltaic window; and a wireless communication system configured to:
receive the electrical power from the photovoltaic to enable wireless communication with the hub device, wherein the wireless communication system is solely powered by the electrical power generated by the photovoltaic; and send a data signal to the hub device, wherein the data signal includes information regarding the photovoltaic window, the information including power data indicating an amount of electrical power being generated by the photovoltaic and being stored in the photovoltaic window.

2. The home automation system of claim 1, wherein each photovoltaic window of the one or more photovoltaic windows does not receive external electrical power from a power source that is external to the photovoltaic window.

3. The home automation system of claim 1, wherein each photovoltaic window of the one or more photovoltaic windows has an average visible transmittance (AVT) of at least 30%.

4. The home automation system of claim 1, wherein each photovoltaic window of the one or more photovoltaic windows includes:
one or more sensors configured to receive the electrical power from the photovoltaic and to capture sensor data from one or both of an interior environment or an exterior environment, wherein the data signal includes the sensor data.

5. The home automation system of claim 1, wherein each photovoltaic window of the one or more photovoltaic windows includes:
one or more window functions configured to receive the electrical power from the photovoltaic and to perform one or more window actions.

6. The home automation system of claim 5, wherein the one or more window functions includes at least one of:
a window opening/closing mechanism;
a window locking/unlocking mechanism;
electric blinds;
a polymer-dispersed liquid crystals (PDLC) film;
an electrochromic device; or
a light source.

7. The home automation system of claim 5, wherein the wireless communication system is further configured to:
receive a control signal from the hub device; and
perform the one or more window actions in accordance with the control signal.

8. The home automation system of claim 1, further comprising:
one or more home functions configured to:
receive external electrical power from a power source that is external to the one or more photovoltaic windows;
receive a control signal from the hub device; and
perform one or more home actions in accordance with the control signal.

9. The home automation system of claim 8, wherein the one or more home functions includes at least one of:
room or exterior lighting;
a heating or cooling system; or
a door lock.

10. A method of operating a home automation system, the method comprising:
for each photovoltaic window of one or more photovoltaic windows of the home automation system:
generating electrical power from incident light onto the photovoltaic window using a photovoltaic of the photovoltaic window, wherein the photovoltaic is integrated with a glass of the photovoltaic window, and wherein the photovoltaic substantially covers a visible portion of the photovoltaic window;

sending the electrical power from the photovoltaic to a wireless communication system of the photovoltaic window to enable wireless communication with a hub device of the home automation system, wherein the wireless communication system is solely powered by the electrical power generated by the photovoltaic;

sending a data signal from the wireless communication system to the hub device, wherein the data signal includes information regarding the photovoltaic window, the information including power data indicating an amount of electrical power being generated by the photovoltaic and being stored in the photovoltaic window; and receiving the data signal at the hub device from each of the one or more photovoltaic windows.

11. The method of claim 10, wherein each photovoltaic window of the one or more photovoltaic windows does not receive external electrical power from a power source that is external to the photovoltaic window.

12. The method of claim 10, wherein each photovoltaic window of the one or more photovoltaic windows has an average visible transmittance (AVT) of at least 30%.

13. The method of claim 10, further comprising:
for each photovoltaic window of one or more photovoltaic windows:
sending the electrical power from the photovoltaic to one or more sensors of the photovoltaic window; and
capturing sensor data at the one or more sensors from one or both of an interior environment or an exterior environment, wherein the data signal includes the sensor data.

14. The method of claim 10, further comprising:
for each photovoltaic window of one or more photovoltaic windows:
sending the electrical power from the photovoltaic to one or more window functions of the photovoltaic window; and
performing one or more window actions at the one or more window functions.

15. The method of claim 14, wherein the one or more window functions includes at least one of: a window opening/closing mechanism, a window locking/unlocking mechanism, electric blinds, a polymer-dispersed liquid crystals (PDLC) film, an electrochromic device, or a light source.

16. The method of claim 14, further comprising:
sending a control signal from the hub device to the wireless communication system of a particular photovoltaic window of the one or more photovoltaic windows; and
performing the one or more window actions in accordance with the control signal at the particular photovoltaic window.

17. The method of claim 10, further comprising:
receiving, at one or more home functions of the home automation system, external electrical power from a power source that is external to the one or more photovoltaic windows;

sending a control signal from the hub device to the one or more home functions; and performing the one or more home actions at the one or more home functions in accordance with the control signal.

18. One or more non-transitory computer-readable media comprising instructions that, when executed by one or more processors, cause the one or more processors to perform operations for operating a home automation system, the operations comprising:

for each photovoltaic window of one or more photovoltaic windows of the home automation system:

causing electrical power to be generated from incident light onto the photovoltaic window using a photovoltaic of the photovoltaic window, wherein the photovoltaic is integrated with a glass of the photovoltaic window, and wherein the photovoltaic substantially covers a visible portion of the photovoltaic window;

causing the electrical power to be sent from the photovoltaic to a wireless communication system of the photovoltaic window to enable wireless communication with a hub device of the home automation system, wherein the wireless communication system is solely powered by the electrical power generated by the photovoltaic;

sending a data signal from the wireless communication system to the hub device, wherein the data signal includes information regarding the photovoltaic window, the information including power data indicating an amount of electrical power being generated by the photovoltaic and being stored in the photovoltaic window; and receiving the data signal at the hub device from each of the one or more photovoltaic windows.

* * * * *